(12) United States Patent
Serobian et al.

(10) Patent No.: US 9,546,274 B2
(45) Date of Patent: Jan. 17, 2017

(54) AUTOMOTIVE PROTECTANT COMPOSITIONS WITH IMPROVED VERTICAL CLING

(75) Inventors: Ashot K. Serobian, Martinez, CA (US); Jim Ackerman, San Francisco, CA (US); Kurt Knipmeyer, Dublin, CA (US); Bhaskar Ramachandran, San Ramon, CA (US); Randy Goodwin, Pleasanton, CA (US)

(73) Assignee: THE ARMOR ALL/STP PRODUCTS COMPANY, Danbury, CT (US)

( * ) Notice: Subject to any disclaimer, the term of this patent is extended or adjusted under 35 U.S.C. 154(b) by 790 days.

(21) Appl. No.: 12/472,227

(22) Filed: May 26, 2009

(65) Prior Publication Data

US 2010/0305260 A1    Dec. 2, 2010

(51) Int. Cl.
*C08L 83/06* (2006.01)
*C09K 3/00* (2006.01)
*C08L 83/04* (2006.01)

(52) U.S. Cl.
CPC .................................. *C08L 83/04* (2013.01)

(58) Field of Classification Search
CPC .................................. C08L 83/06; C09K 3/00
USPC .................................. 524/506, 588; 510/466
See application file for complete search history.

(56) References Cited

U.S. PATENT DOCUMENTS

| | | |
|---|---|---|
| 3,929,678 A | 12/1975 | Laughlin et al. |
| 4,259,217 A | 3/1981 | Murphy |
| 5,433,890 A | 7/1995 | Meyer et al. |
| 5,661,208 A | 8/1997 | Estes |
| 5,693,704 A | 12/1997 | Estes |
| 5,844,007 A | 12/1998 | Kijima |
| 5,989,640 A | 11/1999 | Kijima |
| 6,206,956 B1 | 3/2001 | Muntz et al. |
| 6,221,433 B1 | 4/2001 | Muntz et al. |
| 7,318,871 B2 | 1/2008 | Egan et al. |
| 2005/0250668 A1* | 11/2005 | Serobian et al. ............. 510/466 |
| 2007/0275867 A1* | 11/2007 | Serobian ....................... 510/466 |
| 2008/0280070 A1* | 11/2008 | Knischka et al. ............. 427/595 |

FOREIGN PATENT DOCUMENTS

| | | |
|---|---|---|
| CA | 1176828 | 10/1984 |
| EP | 0839876 | 5/1998 |

OTHER PUBLICATIONS

Intellectual Property Office Search Report dated Nov. 25, 2015 from corresponding United Kingdom Patent Application No. GB1503301.2, pp. 5.

* cited by examiner

*Primary Examiner* — James J Seidleck
*Assistant Examiner* — Deve E Valdez
(74) *Attorney, Agent, or Firm* — Ohlandt, Greeley, Ruggiero & Perle, L.L.P.

(57) ABSTRACT

The present invention relates generally to compositions, methods of use and kits for use as an automotive protectant composition and/or automotive cleaning composition. The protectant composition and/or cleaning composition comprises at least one surfactant and at least one rheology modifier, at least one silicone component, and water. The composition also optionally comprise, pH adjusters, builders, alkalinity sources, wetting agents, spreading agents, UV absorbers. The protectant composition has a viscosity of about 4000 to 6000 cps and exhibits a Vertical Cling parameter of between 1 and about 7 at a temperature of about 25° C. on automotive surfaces to which the compositions are applied.

49 Claims, No Drawings

AUTOMOTIVE PROTECTANT COMPOSITIONS WITH IMPROVED VERTICAL CLING

BACKGROUND OF THE INVENTION

Field of the Invention

The present invention relates generally to compositions, methods of use and kits for an automotive protectant exhibiting beneficial surface adhesion and application characteristics. These surface adhesion and application characteristics are measured and quantified as Vertical Cling of a composition. A composition with a very high Vertical Cling parameter, greater than 7, runs off a vertical surface very quickly which makes it difficult to get uniform coverage of a composition on vertical, sloped or angled surfaces which are common with automotive surfaces. A very low Vertical Cling parameter, less than 1, means the composition has very strong surface adhesion on vertical surfaces and will not run. Having a very low Vertical Cling parameter, it may not be beneficial because the composition may not be sprayable or it may not be easily spreadable or may not be easy to apply to surfaces and obtain uniform coverage.

The present invention also relates to a protectant composition which forms an sprayable aqueous silicone emulsion containing at least one surfactant and a rheology modifier, a silicone, and water. The composition exhibits a Vertical Cling parameter of between 1 and about 7 at a temperature of about 25° C. The present invention also relates to a method of cleaning, providing gloss and/or protecting an interior automotive surface by applying the inventive composition directly to a soiled or cleaned surface and then spreading the composition across the surface with a substrate. The substrate may be a nonwoven material comprising cellulosic fibers, modified cellulosic materials, synthetic fibers or a mixture of cellulosic or modified cellulosic and synthetic fibers. The synthetic fibers are selected from the group consisting of: polyethylene, polypropylene, and Polyethylene terephthalate (PET) and any mixture or combination thereof. In an alternate embodiment, the composition may be applied to an automotive surface using a pre-loaded wipe or substrate which is loaded with a protectant composition. Most particularly, the present invention relates to an automotive protectant and/or cleaning kit which employs a deformable container with a sprayer device that enables application of the composition to the surface to be treated where it may be spread across the surface by hand using a substrate, where the protectant composition exhibits a Vertical Cling parameter of between 1 and about 7 at a temperature of about 25° C.

The present invention pertains to sprayable silicone-containing protectant compositions used to enhance gloss and aid in protecting automotive surfaces. More particularly, the present invention pertains to protectant compositions which are aqueous silicone emulsions which provide uniform gloss and protection to surface without dripping or running. In addition, the inventive protectant composition usually contains less silicone, but yet provides comparable or higher gloss as compared to other prior art and/or commercial formulations.

Description of the Related Art

Silicone-based automotive protectants are now established products in the marketplace. By the term "automotive protectants" is meant those products which are applied to vinyl, leather, plastics, rubber, and other interior and exterior surfaces of automobiles, trucks, and other vehicles to improve the gloss of such surfaces. The protectants also to protect such surfaces from the damaging effects of uv rays, sunlight, heat, moisture, etc. Although described as "automotive protectants", the term "automotive" is not meant as a restriction on the use of these compositions, which may be equally useful on boats, trains, planes, outdoor furniture, indoor furniture etc., and also for a variety of interior uses.

The protectant may be sprayed directly onto the surface to be treated, or may be first sprayed onto a cloth, pad, or the like and then applied to the intended surface. Evaporation of the aqueous continuous phase leaves an organopolysiloxane coating which may, in some cases, penetrate polymer substrates, ameliorating loss of plasticizers from such surfaces due to exposure to sun and heat. The protectants are often formulated with UV absorbers as well, and the net effect is not only providing a glossy appearance to the vehicle or other product, but also in a general prolonging of life of leather and vinyl surfaces to which the protectant has been applied.

While lotion and paste-type protectants are available, these have not met the acceptance of sprayable formulations, due not only to their increased difficulty in application to the surface, but also due to their propensity to leave a buildup of protectant at seams, crevices, and on highly textured surfaces such as crushed leather-like vinyl. Examples of such paste and lotion-type protectants are provided by U.S. Pat. No. 5,433,890, wherein protectants containing both an aminofunctional organopolysiloxane and a polydimethylsiloxane, a film forming polymer to increase abrasion resistance, and morpholine, necessary to activate the film forming polymer are disclosed. These protectants must be left on the surface for a considerable period before wiping off the excess, and maximum effectiveness is achievable only with a second coating. The disadvantages of such preparations are readily apparent.

In Canadian published application CA 1,176,828, paste-type, organopolysiloxane emulsion-based polishes which contain a silicone-soluble UV absorbent are disclosed. These polishes have a high proportion of organopolysiloxane, greater than 20 weight percent solids, and an organic thickening agent which provides the paste-like character of the polish and serves to maintain the high level of silicone solids uniformly dispersed. However, these compositions are not sprayable, and therefore suffer the drawbacks of other pastes, creams, and lotions. Moreover, they contain a high proportion of relatively expensive organopolysiloxane.

The active ingredients of automotive protectants include silicones, which are typically organopolysiloxanes. Organopolysiloxanes are relatively expensive, and a typical protectant may contain from 20 weight percent to 40 weight percent organopolysiloxane as an aqueous emulsion. Despite the relatively high amount of organopolysiloxane, studies demonstrate that only a relatively small amount, i.e. 10% to 20% of what is applied, actually ends up on the substrate. It would be desirable to be able to lower the amount of organopolysiloxane in automotive protectants without lowering performance, or to obtain increased performance at the same level of active ingredient. Even with the same organopolysiloxane content, improved performance may allow the application rate to be lowered, resulting in greater economy to the purchaser.

Two patents, U.S. Pat. No. 6,221,433 and U.S. Pat. No. 6,206,956, by Muntz et al., describe siloxane automotive protectant compositions which contain about 10% to 20% by weight of organopolysiloxane and having comparable or improved gloss performance to comparative examples with 20% to 40% by weight of organopolysiloxane. The siloxane automotive protectants described in the Muntz patents, require that the viscosity of the emulsion be less than about 4000 cP to maintain it sprayabilty. Although these protectant formulations are an improvement over the previous protectants, there is still an opportunity to lower the amount of siloxane in the formulation to levels of less than 10% to achieve a cost savings while maintaining good gloss performance. In addition, these formulations described by Muntz have a viscosity of less than 4000 cps and do not exhibit good vertical cling and have a tendency to drip and run off of surfaces.

Accordingly, there is a need in the art for improved protectant compositions and methods of using said protectants which will provide good gloss and protection of automotive surfaces with low amounts of silicone and which have improved application and vertical cling properties so that they can be uniformly applied to surfaces without dripping and running.

SUMMARY OF THE INVENTION

In accordance with the above objects and those that will be mentioned and will become apparent below, one aspect of the present invention is a protectant composition containing at least one surfactant and a rheology modifier that exhibits a Vertical Cling parameter of between 1 and about 7 at a temperature of about 25° C. In one embodiment of the present invention, the inventive cleaning concentrate adheres to a wetted vertical surface of an automobile without running, dripping or flowing excessively as measured by the Vertical Cling parameter.

In another embodiment of the present invention is a protectant composition containing at least one surfactant and a rheology modifier that exhibits a Vertical Cling parameter of between 1 and about 7 at a temperature of about 25° C., and optionally containing a solvent, and optionally containing an alkalinity source.

In yet another embodiment of the present invention is a protectant composition containing at least one surfactant, at least one silicone and a rheology modifier that exhibits a Vertical Cling parameter of between 1 and about 7 at a temperature of about 25° C., and optionally containing an alkalinity source.

In yet one further embodiment of the present invention is a protectant composition containing a mixture of nonionic and anionic surfactants, a silicone and a rheology modifier that exhibits a Vertical Cling parameter of between 1 and about 7 at a temperature of about 25° C., and optionally other adjuncts that provide at least one additional aesthetic, cleaning and/or protecting benefit to the inventive compositions.

In another embodiment of the present invention is a method of protecting an automotive surface by spraying the inventive protectant composition that exhibits a Vertical Cling parameter of between 1 and about 7 at a temperature of about 25° C. directly to a clean automotive surface, followed by spreading the inventive compositions to provide uniform gloss and protection. In another embodiment of the present invention is a method of applying the protectant composition to a soiled surface and spreading the protectant formulation onto the substrate surface to clean and to protect the surface.

In one further embodiment of the present invention is a kit employing the inventive automotive protectant, a dispensing package and instructions for applying the protectant directly onto a cleaned or soiled automotive surface. In one aspect of this embodiment of the present invention is a vehicular cleaning kit which employs a trigger sprayer or an aerosol sprayer that enables the uniform application of the protectant composition to a surface and exhibits a Vertical Cling parameter of between 1 and about 7 at a temperature of about 25° C.

In yet a further embodiment of the present invention is a method for protecting an automotive surface comprising the steps of (a) spraying to the automotive surface with a protectant composition having a Vertical Cling parameter of between 1 and about 7 at a temperature of about 25° C., wherein the protectant composition contains (i) a mixture of nonionic and anionic surfactants; (ii) a polyorganosiloxane; (iii); and (iv) a rheology modifier; and (b) spreading the protectant composition across the automotive surface.

In an embodiment of the present invention, the vehicular cleaning kit instructions include step wise directions for a method of use whereby the inventive compositions are applied directing onto a soiled surface, followed by a cleaning step wherein the concentrated cleaner is spread across the surface to act on soil, followed by a rinsing step with water to remove the cleaning concentrate and soil.

Further features and advantages of the present invention will become apparent to those of ordinary skill in the art in view of the detailed description of suitable embodiments below, when considered together with the attached claims.

DETAILED DESCRIPTION

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

It must be noted that, as used in this specification and the appended claims, the singular forms "a," "an" and "the" include plural referents unless the content clearly dictates otherwise. Thus, for example, reference to a "surfactant" includes two or more such surfactants.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, exemplary materials and methods are described herein.

In the application, effective amounts are generally those amounts listed as the ranges or levels of ingredients in the descriptions, which follow hereto. Unless otherwise stated, amounts listed in percentage ("%'s") are in weight percent of the total composition. Compositions are generally expressed in weight percent equivalent to 100% active material (active weight basis) and thus carrier or solvent weight is not included in the expressed percentage.

As used herein, the term "polymer" generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

The term "protectant composition", as used herein, is meant to mean and include a formulation having at least one surfactant and at least one silicone component.

The term "surfactant", as used herein, is meant to mean and include a substance or compound that reduces surface tension when dissolved in water or water solutions, or that reduces interfacial tension between two liquids, or between a liquid and a solid. The term "surfactant" thus includes anionic, cationic, nonionic, zwitterionic and/or amphoteric agents.

The terms "viscosity", as used herein is the viscosity of a liquid component of the invention as quoted as a kinematic viscosity in centipoise (cps), measured at 25° C. (77° F.), unless otherwise specified.

Composition

The inventive compositions comprise combinations of a surfactant and a rheology modifier, and a silicone, that are combined to provide a protectant composition having a suitable substantivity to a vertical surface, defined by a Vertical Cling parameter, such that when applied to a vertical surface, the inventive compositions do not run, drip or flow excessively from the point of application. The inventive compositions contain at least one silicone component to provide gloss and luster to the surface and contain at least one rheology modifier that contributes to thickening and the desirable rheological properties that provide the compositions with a Vertical Cling parameter of between 1 and about 7 at a temperature of about 25° C.

Surfactant

The inventive compositions contain at least one surfactant. The inventive compositions may contain one or more surfactants selected from anionic, nonionic, cationic, ampholytic, amphoteric and zwitterionic surfactants and mixtures thereof. A typical listing of anionic, nonionic, ampholytic, and zwitterionic classes, and species of these surfactants, is given in U.S. Pat. No. 3,929,678 to Laughlin and Heuring, which is hereby incorporated by reference. A list of suitable cationic surfactants is given in U.S. Pat. No. 4,259,217 to Murphy, which is hereby incorporated by reference. Where present, ampholytic, amphoteric and zwitterionic surfactants are generally used in combination with one or more anionic and/or nonionic surfactants.

The composition may comprise an anionic surfactant. Essentially any anionic surfactants useful for detersive purposes can be comprised in the inventive composition. These can include salts (including, for example, sodium, potassium, ammonium, and substituted ammonium salts such as mono-, di- and tri-ethanolamine salts) of the anionic sulfate, sulfonate, carboxylate and sarcosinate surfactants. Anionic surfactants may comprise a sulfonate or a sulfate surfactant. Anionic surfactants may comprise an alkyl sulfate, a linear or branched alkyl benzene sulfonate, or an alkyldiphenyloxide disulfonate, as described herein. Preferred anionic surfactants, include but are not limited to, secondary alkane sulphonate sodium salt surfactants like HOSTAPUR® SAS 30, HOSTAPUR® SAS 60, both sold by Clariant Functional Chemicals and alkoxylate sulfate surfactant like TRITON™ W30, sold by The Dow Chemical Company.

Other anionic surfactants include the isethionates such as the acyl isethionates, N-acyl taurates, fatty acid amides of methyl tauride, alkyl succinates and sulfosuccinates, monoesters of sulfosuccinate (for instance, saturated and unsaturated C12-C18 monoesters)diesters of sulfosuccinate (for instance saturated and unsaturated C6-C14 diesters), N-acyl sarcosinates. Resin acids and hydrogenated resin acids are also suitable, such as rosin, hydrogenated rosin, and resin acids and hydrogenated resin acids present in or derived from tallow oil. Anionic sulfate surfactants suitable for use herein include the linear and branched primary and secondary alkyl sulfates, alkyl ethoxysulfates, fatty oleoyl glycerol sulfates, alkyl phenol ethylene oxide ether sulfates, the C5-C17acyl-N—(C1-C4 alkyl) and —N—(C1-C2hydroxyalkyl)glucamine sulfates, and sulfates of alkylpolysaccharides such as the sulfates of alkylpolyglucoside (the nonionic non-sulfated compounds being described herein). Alkyl sulfate surfactants may be selected from the linear and branched primary C10-C18 alkyl sulfates, the C11-C15 branched chain alkyl sulfates, or the C12-C14 linear chain alkyl sulfates.

Alkyl ethoxysulfate surfactants may be selected from the group consisting of the C10-C18 alkyl sulfates which have been ethoxylated with from 0.5 to 20 moles of ethylene oxide per molecule. The alkyl ethoxysulfate surfactant may be a C11-C18, or a C11-C15 alkyl sulfate which has been ethoxylated with from 0.5 to 7, or from 1 to 5, moles of ethylene oxide per molecule. One aspect of the invention employs mixtures of the alkyl sulfate and/or sulfonate and alkyl ethoxysulfate surfactants. Such mixtures have been disclosed in PCT Patent Application No. WO 93/18124, which is hereby incorporated by reference.

Anionic sulfonate surfactants suitable for use herein include the salts of C5-C20 linear alkylbenzene sulfonates, alkyl ester sulfonates, C6-C22 primary or secondary alkane sulfonates, C6-C24 olefin sulfonates, sulfonated polycarboxylic acids, alkyl glycerol sulfonates, fatty acyl glycerol sulfonates, fatty oleoyl glycerol sulfonates, and any mixtures thereof. Suitable anionic carboxylate surfactants include the alkyl ethoxy carboxylates, the alkyl polyethoxy polycarboxylate surfactants and the soaps ('alkyl carboxyl's'), especially certain secondary soaps as described herein. Suitable alkyl ethoxy carboxylates include those with the formula $RO(CH_2CH_2O)_xCH_2COO^-M^+$ wherein R is a C6 to C18 alkyl group, x ranges from 0 to 10, and the ethoxylate distribution is such that, on a weight basis, the amount of material where x is 0 is less than 20% and M is a cation. Suitable alkyl polyethoxypolycarboxylate surfactants include those having the formula $RO-(CHR^1-CHR^2-O)-R^3$ wherein R is a C6 to C18 alkyl group, x is from 1 to 25, $R^1$ and $R^2$ are selected from the group consisting of hydrogen, methyl acid radical, succinic acid radical, hydroxysuccinic acid radical, and mixtures thereof, and $R^3$ is selected from the group consisting of hydrogen, substituted or unsubstituted hydrocarbon having between 1 and 8 carbon atoms, and mixtures thereof.

Suitable soap surfactants include the secondary soap surfactants, which contain a carboxyl unit connected to a secondary carbon. Suitable secondary soap surfactants for use herein are water-soluble members selected from the group consisting of the water-soluble salts of 2-methyl-1-undecanoic acid, 2-ethyl-1-decanoic acid, 2-propyl-1-nonanoic acid, 2-butyl-1-octanoic acid and 2-pentyl-1-heptanoic acid. Certain soaps may also be included as suds suppressors.

Other suitable anionic surfactants are the alkali metal sarcosinates of formula $R-CON(R^1)CH-)COOM$, wherein R is a C5-C17 linear or branched alkyl or alkenyl group, $R^1$ is a C1-C4 alkyl group and M is an alkali metal ion. Examples are the myristyl and oleoyl methyl sarcosinates in the form of their sodium salts.

Essentially any alkoxylated nonionic surfactants are suitable herein, for instance, ethoxylated and propoxylated nonionic surfactants. Alkoxylated surfactants can be selected from the classes of the nonionic condensates of alkyl phenols, nonionic ethoxylated alcohols, nonionic ethoxylated/propoxylated fatty alcohols, nonionic ethoxylate/propoxylate condensates with propylene glycol, and the nonionic ethoxylate condensation products with propylene oxide/ethylene diamine adducts. Preferred nonionic surfactants, include but are not limited to, polyglycol ether nonionic surfactants, like TMN-6 TERGITOL® supplied by SIGMA-ALDRICH®, lauryl alcohol ethoxylated nonionic surfactants, like SURFONIC® L12 Series, supplied by Huntsman Performance Products, and ethoxylated linear primary alcohol nonionic surfactants, like SURFONIC® L Series, specifically SURFONIC® LSF 23-9, both supplied by Huntsman Performance Products.

The condensation products of aliphatic alcohols with from 1 to 25 moles of alkylene oxide, particularly ethylene oxide and/or propylene oxide, are suitable for use herein. The alkyl chain of the aliphatic alcohol can either be straight or branched, primary or secondary, and generally contains from 6 to 22 carbon atoms. Also suitable are the condensation products of alcohols having an alkyl group containing from 8 to 20 carbon atoms with from 2 to 10 moles of ethylene oxide per mole of alcohol.

Polyhydroxy fatty acid amides suitable for use herein are those having the structural formula $R^2CONR^1Z$ wherein: $R^1$ is H, C1-C4 hydrocarbyl, 2-hydroxyethyl, 2-hydroxypropyl, ethoxy, propoxy, or a mixture thereof, for instance, C1-C4 alkyl, or C1 or C2 alkyl; and $R^2$ is a C5-C31 hydrocarbyl, for instance, straight-chain C5-C19 alkyl or alkenyl, or straight-chain C9-C17 alkyl or alkenyl, or straight-chain C11-C17 alkyl or alkenyl, or mixture thereof-, and Z is a polyhydroxyhydrocarbyl having a linear hydrocarbyl chain with at least 3 hydroxyls directly connected to the chain, or an alkoxylated derivative (for example, ethoxylated or propoxylated) thereof. Z may be derived from a reducing sugar in a reductive amination reaction, for example, Z is a glycidyl.

Suitable fatty acid amide surfactants include those having the formula: $R^1CON(R^2)_2$ wherein $R^1$ is an alkyl group containing from 7 to 21, or from 9 to 17 carbon atoms and each $R^2$ is selected from the group consisting of hydrogen, C1-C4 alkyl, C1-C4 hydroxyalkyl, and $-(C_2H_4O)_xH$, where x is in the range of from 1 to 3.

Suitable alkylpolysaccharides for use herein are disclosed in U.S. Pat. No. 4,565,647 to Llenado, having a hydrophobic group containing from 6 to 30 carbon atoms and a polysaccharide, e.g., a polyglycoside, hydrophilic group containing from 1.3 to 10 saccharide units. Alkylpolyglycosides may have the formula: $R^2O(C_nH_{2n}O)_t(glycosyl)_x$ wherein $R^2$ is selected from the group consisting of alkyl, alkylphenyl, hydroxyalkyl, hydroxyalkylphenyl, and mixtures thereof in which the alkyl groups contain from 10 to 18 carbon atoms; n is 2 or 3; t is from 0 to 10, and x is from 1.3 to 8. The glycosyl may be derived from glucose.

Suitable amphoteric surfactants for use herein include the amine oxide surfactants and the alkyl amphocarboxylic acids. Suitable amine oxides include those compounds having the formula $R^3(OR^4)_xNO(R^5)_2$ wherein $R^3$ is selected from an alkyl, hydroxyalkyl, acylamidopropyl and alkylphenyl group, or mixtures thereof, containing from 8 to 26 carbon atoms; $R^4$ is an alkylene or hydroxyalkylene group containing from 2 to 3 carbon atoms, or mixtures thereof, x is from 0 to 5, alternatively from 0 to 3; and each $R^5$ is an alkyl or hydroxyalkyl group containing from 1 to 3, or a polyethylene oxide group containing from 1 to 3 ethylene oxide groups. Suitable amine oxides are C10-C18 alkyl dimethylamine oxide, and C10-18 acylamido alkyl dimethylamine oxide. A suitable example of an alkyl amphodicarboxylic acid is Miranol(™) C2M Conc. manufactured by Miranol, Inc., Dayton, N.J.

Zwitterionic surfactants can also be incorporated into the inventive compositions. These surfactants can be broadly described as derivatives of secondary and tertiary amines, derivatives of heterocyclic secondary and tertiary amines, or derivatives of quaternary ammonium, quaternary phosphonium or tertiary sulfonium compounds. Betaine and sultaine surfactants are exemplary zwitterionic surfactants for use herein.

Suitable betaines are those compounds having the formula $R(R^1)_2N^+R^2COO^-$ wherein R is a C6-C18 hydrocarbyl group, each $R^1$ is typically C1-C3 alkyl, and $R^2$ is a C1-C5 hydrocarbyl group. Suitable betaines are C12-18 dimethylammonium hexanoate and the C10-18 acylamidopropane (or ethane) dimethyl (or diethyl) betaines. Complex betaine surfactants are also suitable for use herein.

Suitable cationic surfactants to be used herein include the quaternary ammonium surfactants. The quaternary ammonium surfactant may be a mono C6-C16, or a C6-C10 N-alkyl or alkenyl ammonium surfactant wherein the remaining N positions are substituted by methyl, hydroxyethyl or hydroxypropyl groups. Suitable are also the monoalkoxylated and bis-alkoxylated amine surfactants.

Another suitable group of cationic surfactants, which can be used in the inventive compositions, are cationic ester surfactants. The cationic ester surfactant is a compound having surfactant properties comprising at least one ester (i.e. —COO—) linkage and at least one cationically charged group. Suitable cationic ester surfactants, including choline ester surfactants, have for example been disclosed in U.S. Pat. Nos. 4,228,042, 4,239,660 and 4,260,529, which are all hereby incorporated by reference. The ester linkage and cationically charged group may be separated from each other in the surfactant molecule by a spacer group consisting of a chain comprising at least three atoms (i.e. of three atoms chain length), or from three to eight atoms, or from three to five atoms, or three atoms. The atoms forming the spacer group chain are selected from the group consisting, of carbon, nitrogen and oxygen atoms and any mixtures thereof, with the proviso that any nitrogen or oxygen atom in said chain connects only with carbon atoms in the chain. Thus spacer groups having, for example, —O—O— (i.e. peroxide), —N—N—, and —N—O— linkages are excluded, whilst spacer groups having, for example —CH$_2$—O—, CH$_2$— and —CH$_2$—NH—CH$_2$— linkages are included. The spacer group chain may comprise only carbon atoms, or the chain is a hydrocarbyl chain.

The inventive composition may comprise cationic monoalkoxylated amine surfactants, for instance, of the general formula: $R^1R^2R^3N^+ApR^4X^-$ wherein $R^1$ is an alkyl or alkenyl moiety containing from about 6 to about 18 carbon atoms, or from 6 to about 16 carbon atoms, or from about 6 to about 14 carbon atoms; $R^2$ and $R^3$ are each independently alkyl groups containing from one to about three carbon atoms, for instance, methyl, for instance, both $R^2$ and $R^3$ are methyl groups; $R^4$ is selected from hydrogen, methyl and ethyl; $X^-$ is an anion such as chloride, bromide, methylsulfate, sulfate, or the like, to provide electrical neutrality; A is a alkoxy group, especially a ethoxy, propoxy or butoxy group; and p is from 0 to about 30, or from 2 to about 15, or from 2 to about 8. The ApR$^4$ group in the formula may have p=1 and is a hydroxyalkyl group, having no greater than 6 carbon atoms whereby the —OH group is separated from the quaternary ammonium nitrogen atom by no more than 3 carbon atoms. Suitable ApR$^4$ groups are —CH$_2$CH$_2$-OH, —CH$_2$CH$_2$CH$_2$-OH, —CH$_2$CH(CH$_3$)—OH and —CH(CH$_3$)CH$_2$—OH. Suitable R$^1$ groups are linear alkyl groups, for instance, linear R$^1$ groups having from 8 to 14 carbon atoms.

Suitable cationic mono-alkoxylated amine surfactants for use herein are of the formula R$^1$(CH$_3$)(CH$_3$)N$^+$(CH$_2$CH$_2$O)$_{2-5}$HX$^-$ wherein R$^1$ is C10-C18 hydrocarbyl and mixtures thereof, especially C10-C14 alkyl, or C10 and C12 alkyl, and X is any convenient anion to provide charge balance, for instance, chloride or bromide. As noted, compounds of the foregoing type include those wherein the ethoxy (CH$_2$CH$_2$O) units (EO) are replaced by butoxy, isopropoxy [CH(CH$_3$)CH$_2$O] and [CH$_2$CH(CH$_3$)O] units (i-Pr) or n-propoxy units (Pr), or mixtures of EO and/or Pr and/or i-Pr units.

The cationic bis-alkoxylated amine surfactant may have the general formula: R$^1$R$^2$N$^+$ApR$^3$A'qR$^4$X$^-$ wherein R$^1$ is an alkyl or alkenyl moiety containing from about 8 to about 18 carbon atoms, or from 10 to about 16 carbon atoms, or from about 10 to about 14 carbon atoms; R$^2$ is an alkyl group containing from one to three carbon atoms, for instance, methyl; R$^3$ and R$^4$ can vary independently and are selected from hydrogen, methyl and ethyl, X$^-$ is an anion such as chloride, bromide, methylsulfate, sulfate, or the like, sufficient to provide electrical neutrality. A and A' can vary independently and are each selected from C1-C4 alkoxy, for instance, ethoxy, (i.e., —CH$_2$CH$_2$O—), propoxy, butoxy and mixtures thereof, p is from 1 to about 30, or from 1 to about 4 and q is from 1 to about 30, or from 1 to about 4, or both p and q are 1.

Suitable cationic bis-alkoxylated amine surfactants for use herein are of the formula R$^1$CH$_3$N$^+$(CH$_2$CH$_2$OH)(CH$_2$CH$_2$OH)X$^-$, wherein R$^1$ is C10-C18 hydrocarbyl and mixtures thereof, or C10, C12, C14 alkyl and mixtures thereof, X$^-$ is any convenient anion to provide charge balance, for example, chloride. With reference to the general cationic bis-alkoxylated amine structure noted above, since in one example compound R$^1$ is derived from (coconut) C12-C14 alkyl fraction fatty acids, R$^2$ is methyl and ApR$^3$ and A'qR$^4$ are each monoethoxy.

Other cationic bis-alkoxylated amine surfactants useful herein include compounds of the formula: R$^1$R$^2$N$^+$—(CH$_2$CH$_2$O)$_p$H—(CH$_2$CH$_2$O)$_q$H X$^-$ wherein R$^1$ is C10-C18 hydrocarbyl, or C10-C14 alkyl, independently p is 1 to about 3 and q is 1 to about 3, R$^2$ is C1-C3 alkyl, for example, methyl, and X$^-$ is an anion, for example, chloride or bromide. Other compounds of the foregoing type include those wherein the ethoxy (CH$_2$CH$_2$O) units (EO) are replaced by butoxy (Bu) isopropoxy [CH(CH$_3$)CH$_2$O] and [CH$_2$CH(CH$_3$)O] units (i-Pr) or n-propoxy units (Pr), or mixtures of EO and/or Pr and/or i-Pr units.

The inventive compositions may include a fluorosurfactant selected from nonionic fluorosurfactants, cationic fluorosurfactants, and mixtures thereof which are soluble or dispersible in the aqueous compositions being taught herein, sometimes compositions which do not include further detersive surfactants, or further organic solvents, or both. Suitable nonionic fluorosurfactant compounds are found among the materials presently commercially marketed under the trade name Fluorad® (ex. 3M Corp.) Exemplary fluorosurfactants include those sold as Fluorad® FC-740, generally described to be fluorinated alkyl esters; Fluorad® FC-430, generally described to be fluorinated alkyl esters; Fluorad® FC-431, generally described to be fluorinated alkyl esters; and, Fluorad® FC-170-C, which is generally described as being fluorinated alkyl polyoxyethylene ethanols.

Suitable nonionic fluorosurfactant compounds include those which is believed to conform to the following formulation:

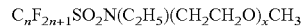
C$_n$F$_{2n+1}$SO$_2$N(C$_2$H$_5$)(CH$_2$CH$_2$O)$_x$CH$_3$ wherein: n has a value of from 1-12, or from 4-12, or 8; x has a value of from 4-18, or from 4-10, or 7; which is described to be a nonionic fluorinated alkyl alkoxylate and which is sold as Fluorad® FC-171 (ex. 3M Corp., formerly Minnesota Mining and Manufacturing Co.).

Additionally suitable nonionic fluorosurfactant compounds are also found among the materials marketed under the trade name ZONYL® (DuPont Performance Chemicals). These include, for example, ZONYL® FSO and ZONYL® FSN. These compounds have the following formula:

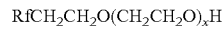
RfCH$_2$CH$_2$O(CH$_2$CH$_2$O)$_x$H where Rf is CF$_3$(CF$_2$CF$_2$)$_y$. For ZONYL® FSO, x is 0 to about 15 and y is 1 to about 7. For ZONYL® FSN, x is 0 to about 25 and y is 1 to about 9.

An example of a suitable cationic fluorosurfactant compound has the following structure: C$_n$F$_{2n+1}$SO$_2$NHC$_3$H$_6$N$^+$(CH$_3$)$_3$I$^-$ where n~8. This cationic fluorosurfactant is available under the trade name Fluorad® FC-135 from 3M. Another example of a suitable cationic fluorosurfactant is CF$_3$—(CF$_2$)$_n$—(CH$_2$)$_m$SCH$_2$CHOH—CH$_2$—N$^+$R$_1$R$_2$R$_3$Cl$^-$ wherein: n is 5-9 and m is 2, and R$_1$, R$_2$ and R$_3$ are —CH$_3$. This cationic fluorosurfactant is available under the trade name ZONYL® FSD (available from DuPont, described as 2-hydroxy-3-((gamma-omega-perfluoro-C$_{6-20}$-alkyl)thio)-N,N,N-trimethyl-1-propyl ammonium chloride). Other cationic fluorosurfactants suitable for use in the present invention are also described in EP 866,115 to Leach and Niwata, which is hereby incorporated by reference.

In one embodiment of the invention the composition contains a mixture of anionic and nonionic surfactants. In this embodiment of the invention, it is preferred that the ratio of the nonionic surfactant to the anionic surfactant is about 1:1 to about 3:2. In this embodiment of the invention, the nonionic surfactant is preferably selected from alkoxylated surfactants, and more preferably selected from nonionic ethoxylated alcohols. The anionic surfactant is preferably a sulfonate surfactant, and more preferably an alkyl sulfonate surfactant. In one embodiment of the invention, the anionic surfactant is at a level of about 0.1% to about 5% by weight of the composition and the nonionic surfcantant is at a level of about 0.1 to about 5% by weight of the composition. In one embodiment, there are more than one nonionic surfactants which combined are at a level of less than 5% by weight of the composition. In another embodiment there may be more than one anionic surfactants which when combined are at a level of less than 5% by weight of the composition. In one embodiment the percentage ratio of nonionic to anionic surfactant(s) is about 50% to 50%, in another embodiment it is 55% to 45%, and in a further embodiment it is about 60% to 40%.

The surfactant may be present in the compositions of the present invention at a level of from about 0.01% to 20%, or from about 0.1% to 10%, or from about 0.1% to 5% by weight.

Rheology Modifier

The inventive compositions contain at least one rheology modifier that contributes to both thickening and the rheological structure of the cleaning concentrate and contributes to the desirable vertical clinging characteristics of the present invention. The at least one rheology modifier may be selected from the group consisting of organic polymers, natural polymers, inorganic thickeners, and their derivatives. Mixtures of the rheology modifiers may also be suitably employed.

In general, any suitable organic polymer may be employed as a rheology modifier, such organic polymer generally referring to the class of synthetic or man-made polymers. The inventive compositions may employ water-soluble or water dispersible polymers. The inventive compositions may employ nonionic (neutral and/or non-ionizable), anionic and/or cationic polymers, and their mixtures. Suitable anionic polymers include those with ionizable groups that are at least partially anionic in solution, that is carrying a negative charge in solution, or which can be at least partially or fully neutralized to be at least partially or fully anionic in solution. Suitable cationic polymers include polymers that are ionizable (i.e. capable of being protonated) and those with permanent cationic groups, that is carrying a permanent positive charge, in solution. The inventive compositions may employ hydrophilic polymers, hydrophobic polymers or polymers exhibiting both properties owing to the presence of hydrophilic and hydrophobic monomer moieties. Suitable hydrophilic polymers are those that are attracted to surfaces and are absorbed thereto without covalent bonds. Examples of suitable polymers include the polymers and co-polymers of N,N-dialkyl acrylamide, acrylamide, and certain monomers containing substituted and/or unsubstituted quaternary ammonium groups and/or amphoteric groups that favor substantivity to surfaces, along with co-monomers that favor adsorption of water, such as, for example, acrylic acid and other acrylate salts, sulfonates, betaines, and ethylene oxides. Water soluble or water dispersible cationic polymers may be suitable for their charge dissipative effect, antistatic, surface lubricating and potential softening benefits.

With respect to the synthesis of a water soluble or water dispersible cationic copolymer, the level of the first monomer, which has a permanent cationic charge or that is capable of forming a cationic charge on protonation, is typically between 3 and 80 mol % or alternatively between 10 to 60 mol % of the copolymer. The level of second monomer, which is an acidic monomer that is capable of forming an anionic charge in the composition, when present is typically between 3 and 80 mol % or alternatively between 10 to 60 mol % of the copolymer. The level of the third monomer, which has an uncharged hydrophilic group, when present is typically between 3 and 80 mol % or alternatively between 10 to 60 mol % of the copolymer. When present, the level of uncharged hydrophobic monomer is less than about 50 mol % or alternatively less than 10 mol % of the copolymer. The molar ratio of the first monomer to the second monomer typically ranges from 19:1 to 1:10 or alternatively ranges from 9:1 to 1:6. The molar ratio of the first monomer to the third monomer is typically ranges from 4:1 to 1:4 or alternatively ranges from 2:1 to 1:2.

The average molecular weight of the copolymer typically ranges from about 5,000 to about 10,000,000, with the suitable molecular weight range depending on the polymer composition with the proviso that the molecular weight is selected so that the copolymer is water soluble or water dispersible to at least 0.01% by weight in distilled water at 25° C.

Examples of permanently cationic monomers include, but are not limited to, quaternary ammonium salts of substituted acrylamide, methacrylamide, acrylate and methacrylate, such as trimethylammoniumethylmethacrylate, trimethylammoni-umpropylmethacrylamide, trimethylammonium-ethylmethacrylate, trimethyl-ammoniumpropylacrylamide, 2-vinyl N-alkyl quaternary pyridinium, 4-vinyl N-alkyl quaternary pyridinium, 4-vinylbenzyltrialkylammonium, 2-vinyl piperi-dinium, 4-vinyl piperidinium, 3-alkyl 1-vinyl imidazolium, diallyldimethylammoni-um, and the ionene class of internal cationic monomers as described by D. R. Berger in *Cationic Surfactants, Organic Chemistry*, edited by J. M. Richmond, Marcel Dekker, New York, 1990, ISBN 0-8247-8381-6, which is incorporated herein by reference. This class includes co-poly ethylene imine, co-poly ethoxylated ethylene imine and co-poly quaternized ethoxylated ethylene imine, co-poly [(dimethylimino)trimethylene (dimethylimino)hexamethylene disalt], co-poly [(diethylimino) trimethylene (dimethylimino)trimethylene disalt], co-poly [(dimethylimino)2-hydroxypropyl salt], co-polyquarternium-2, co-polyquarterni-um-17, and co-polyquarternium-18, as described in the *International Cosmetic Ingredient Dictionary*, 5th Edition, edited by J. A. Wenninger and G. N. McEwen, which is incorporated herein by reference. Other cationic monomers include those containing cationic sulfonium salts such as co-poly-1-[3-methyl-4-(vinyl-benzyloxy) phenyl] tetrahydrothiophenium chloride. Especially suitable monomers are mono- and di-quaternary derivatives of methacrylamide. The counterion of the cationic co-monomer can be selected from, for example, chloride, bromide, iodide, hydroxide, phosphate, sulfate, hydrosulfate, ethyl sulfate, methyl sulfate, formate, and acetate.

Examples of monomers that are cationic on protonation include, but are not limited to, acrylamide, N,N-dimethylacrylamide, N,N di-isopropylacryalmide, N-vinylimidazole, N-vinylpyrrolidone, ethyleneimine, dimethylaminohydroxypropyl diethylenetriamine, dimethylaminoethylmethacrylate, dimethylaminopropyl-methacryl-amide, dimethylaminoethylacrylate, dimethylaminopropylacrylamide, 2-vinyl pyridine, 4-vinyl pyridine, 2-vinyl piperidine, 4-vinylpiperidine, vinyl amine, diallylamine, methyldiallylamine, vinyl oxazolidone; vinyl methyoxazolidone, and vinyl caprolactam.

Monomers that are cationic on protonation typically contain a positive charge over a portion of the pH range of 2-11. Such suitable monomers are also presented in *Water-Soluble Synthetic Polymers: Properties and Behavior*, Volume II, by P. Molyneux, CRC Press, Boca Raton, 1983, ISBN 0-8493-6136. Additional monomers can be found in the *International Cosmetic Ingredient Dictionary*, 5th Edition, edited by J. A. Wenninger and G. N. McEwen, The Cosmetic, Toiletry, and Fragrance Association, Washington D.C., 1993, ISBN 1-882621-06-9. A third source of such monomers can be found in *Encyclopedia of Polymers and Thickeners for Cosmetics*, by R. Y. Lochhead and W. R. Fron, Cosmetics & Toiletries, vol. 108, May 1993, pp 95-135. All three references are incorporated herein.

Examples of acidic monomers that are capable of forming an anionic charge in the composition include, but are not limited to, acrylic acid, methacrylic acid, ethacrylic acid, dimethylacrylic acid, maleic anhydride, succinic anhydride, vinylsulfonate, cyanoacrylic acid, methylenemalonic acid, vinylacetic acid, allylacetic acid, ethylidine-acetic acid, propylidineacetic acid, crotonic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, citraconic acid, vinylbenzoic acid, N-vinylsuccinamidic acid, mesaconic acid, methacroylalanine, acryloylhydroxyglycine, sulfoethyl methacrylate, sulfopropyl acrylate, and sulfoethyl acrylate. Exemplary acid monomers also include styrenesulfonic acid, 2-methacryloyloxymethane-1-sulfonic acid, 3-methacryloyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid and vinyl phosphoric acid. Suitable monomers include acrylic acid, methacrylic acid and maleic acid. The copolymers useful in this invention may contain the above acidic monomers and the alkali metal, alkaline earth metal, and ammonium salts thereof.

Examples of monomers having an uncharged hydrophilic group include but are not limited to vinyl alcohol, vinyl acetate, vinyl methyl ether, vinyl ethyl ether, ethylene oxide and propylene oxide. Also suitable are hydrophilic esters of monomers, such as hydroxyalkyl acrylate esters, alcohol ethoxylate esters, alkylpolyglycoside esters, and polyethylene glycol esters of acrylic and methacrylic acid.

Finally, examples of uncharged hydrophobic monomers include, but are not limited to, $C_1$-$C_4$ alkyl esters of acrylic acid and of methacrylic acid.

Suitable copolymers are formed by copolymerizing the desired monomers. Conventional polymerization techniques can be employed. Illustrative techniques include, for example, solution, suspension, dispersion, or emulsion polymerization. An exemplary method of preparation is by precipitation or inverse suspension polymerization of the copolymer from a polymerization media in which the monomers are dispersed in a suitable solvent. The monomers employed in preparing the copolymer may be water soluble or sufficiently soluble in the polymerization media to form a homogeneous solution. They readily undergo polymerization to form polymers which are water-dispersible or water-soluble. The exemplary copolymers contain acrylamide, methacrylamide and substituted acrylamides and methacrylamides, acrylic and methacrylic acid and esters thereof. Suitable synthetic methods for these copolymers are described, for example, in Kirk-Othmer, *Encyclopedia of Chemical Technology*, Volume 1, Fourth Ed., John Wiley & Sons.

Other examples of polymers that provide sheeting and anti-spotting benefits are polymers that contain amine oxide hydrophilic groups. Polymers that contain other hydrophilic groups such a sulfonate, pyrrolidone, and/or carboxylate groups can also be used. Examples of desirable polysulfonate polymers include polyvinylsulfonate, and also include polystyrene sulfonate, such as those sold by Monomer-Polymer Dajac (1675 Bustleton Pike, Feasterville, Pa. 19053). A typical formula is as follows: [CH($C_6H_4SO_3Na$)—$CH_2$]$_n$—CH($C_6H_5$)—$CH_2$ wherein n is a number to give the appropriate molecular weight as disclosed below.

Typical molecular weights are from about 10,000 to about 1,000,000, or alternatively from about 200,000 to about 700,000. Exemplary polymers containing pyrrolidone functionalities include polyvinyl pyrrolidone, quaternized pyrrolidone derivatives (such as Gafquat 755N from International Specialty Products), and co-polymers containing pyrrolidone, such as polyvinylpyrrolidone/dimethylaminoethyl-methacrylate (available from ISP) and polyvinyl pyrrolidone/acrylate (available from BASF). Other materials can also provide substantivity and hydrophilicity including cationic materials that also contain hydrophilic groups and polymers that contain multiple ether linkages. Cationic materials include cationic sugar and/or starch derivatives and the typical block copolymer detergent surfactants based on mixtures of polypropylene oxide and ethylene oxide are representative of the polyether materials. The polyether materials are less substantive, however.

Also suitable are polymers comprising water-soluble amine oxide moieties. It is believed that the partial positive charge of the amine oxide group can act to adhere the polymer to the surface of the surface substrate, thus allowing water to "sheet" more readily. To the extent that polymer anchoring promotes better "sheeting", then higher molecular materials are suitable. Increased molecular weight improves efficiency and effectiveness of the amine oxide-based polymer. Suitable polymers of this invention may have one or more monomeric units containing at least one N-oxide group. At least about 10%, suitably more than about 50%, more suitably greater than about 90% of said monomers forming said polymers contain an amine oxide group. These polymers can be described by the general formula: P(B) wherein each P is selected from homopoly-merizable and copolymerizable moieties which attach to form the polymer backbone, suitably vinyl moieties, e.g. C(R)2=C(R)2, wherein each R is H, C1-C12, alternatively C1-C4 alkyl (ene), C6-C12 aryl(ene) and/or B; B is a moiety selected from substituted and unsubstituted, linear and cyclic C1-C12 alkyl, C1-C12 alkylene, C1-C12 heterocyclic, aromatic C6-C12 groups and wherein at least one of said B moieties has at least one amine oxide group present; u is from a number that will provide at least about 10% monomers containing an amine oxide group to about 90%; and t is a number such that the average molecular weight of the polymer is from about 2,000 to about 500,000, alternatively from about 5,000 to about 250,000, and also alternatively from about 7,500 to about 200,000. Exemplary polymers also include poly(4-vinylpyridine N-oxide)polymers (PVNO), wherein the average molecular weight of the polymer is from about 2,000 to about 500,000, alternatively from about 5,000 to about 400,000, and also alternatively from about 7,500 to about 300,000. In general, higher molecular weight polymers are suitable. Often, higher molecular weight polymers allow for use of lower levels of the polymer, which can provide benefits in surface cleaner applications of the inventive compositions. Lower molecular weights for the exemplary poly-amine oxide polymers of the present invention are due to greater difficulty in manufacturing these polymers in higher molecular weight.

Some non-limiting examples of homopolymers and copolymers which can be used as water soluble polymers of the present invention are: adipic acid/dimethyl-amino-hydroxypropyl diethylenetriamine copolymer; adipic acid/epoxypropyl diethylenetriamine copolymer; polyvinyl alcohol; methacryloyl ethyl betaine/methacrylates copolymer; ethyl acrylate/methyl methacrylate/methacrylic acid/acrylic acid copolymer; polyamine resins; and polyquaternary amine resins; poly(ethenylformamide); poly-(vinylamine)hydrochloride; poly(vinyl alcohol-co-vinylamine); poly(vinyl alcohol-co-vinylamine); poly(vinyl alcohol-co-vinylamine hydrochloride); and poly(vinyl alcohol-co-vinylamine hydrochloride). Alternatively, said copolymer and/or homopolymers are selected from the group consisting of adipic acid/dimethylaminohydroxypropyl diethylenetriamine copolymer; poly(vinylpyrroli-done/dimethylaminoethyl methacrylate); polyvinyl alcohol; ethyl acrylate/methyl methacrylate/ethacrylic acid/acrylic acid copolymer; methacryloyl ethyl betaine/methacrylates copolymer; polyquaternary amine resins; poly(ethenylformamide); poly(vinylamine)hydrochloride; poly(vinyl alcohol-co-vinylamine); poly(vinyl alcohol-co-vinylamine); poly(vinyl alcohol-co-vinylamine hydrochloride); and poly(vinyl alcohol-co-vinylamine hydrochloride).

Polymers useful in the present invention can be selected from the group consisting of copolymers of hydrophilic monomers. The polymer can be linear random or block copolymers, and mixtures thereof. The term "hydrophilic" is used herein consistent with its standard meaning of having at least some affinity for water. As used herein in relation to monomer units and polymeric materials, including the copolymers, "hydrophilic" means substantially water soluble and/or substantially water dispersible. In this regard, "substantially water soluble" or "substantially water dispersible" shall refer to a material that is soluble and/or dispersible in distilled (or equivalent) water, at 25° C., at a concentration of about 0.0001% by weight or greater. The terms "soluble", "solubility", "dispersible", and the like, for purposes hereof, correspond to the maximum concentration of monomer or polymer, as applicable, that can dissolve or disperse in water and/or other solvents, or their mixtures, to form a homogeneous solution, as is well understood to those skilled in the art.

Nonlimiting examples of useful hydrophilic monomers are unsaturated organic mono- and polycarboxylic acids, such as acrylic acid, methacrylic acid, crotonic acid, maleic acid and its half esters, itaconic acid; unsaturated alcohols, such as vinyl alcohol, allyl alcohol; polar vinyl heterocyclics, such as, vinyl caprolactam, vinyl pyridine, vinyl imidazole; vinyl amine; vinyl sulfonate; unsaturated amides, such as acrylamides, e.g., N,N-dimethylacrylamide, N-t-butyl acrylamide; hydroxyethyl methacrylate; dimethylaminoethyl methacrylate; salts of acids and amines listed above; and the like; and mixtures thereof. Some exemplary hydrophilic monomers are acrylic acid, methacrylic acid, N,N-dimethyl acrylamide, N,N-dimethyl methacrylamide, N-t-butyl acrylamide, dimethylamino ethyl methacrylate, thereof, and mixtures thereof.

Polycarboxylate polymers are those formed by polymerization of monomers, at least some of which contain carboxylic functionality. Common monomers include acrylic acid, maleic acid, ethylene, vinyl pyrrolidone, methacrylic acid, methacryloylethylbetaine, etc. Exemplary polymers for substantivity are those having higher molecular weights. For example, polyacrylic acid having molecular weights below about 10,000 are not particularly substantive and therefore do not normally provide hydrophilicity for three rewettings of a treated surface with the inventive compositions, although with higher levels, molecular weights down to about 1000 can provide some results. In general, the polymers should have molecular weights of more than about 10,000. It has also been found that higher molecular weight polymers, e.g., those having molecular weights of more than about 10,000,000, are extremely difficult to formulate and are less effective in providing anti-spotting benefits than lower molecular weight polymers. Accordingly, the molecular weight should normally be, especially for polyacrylates, from about 1,000 to about 10,000,000; alternatively from about 5,000 to about 5,000,000; alternatively from about 10,000 to about 2,500,000; and also suitably from about 20,000 to about 1,000,000.

Non-limiting examples of polymers for use in the present invention include the following: poly(vinyl pyrrolidone/acrylic acid) sold under the name "Acrylidone"® by ISP and poly(acrylic acid) sold under the name "Accumer"® by Rohm & Haas. Other suitable materials include sulfonated polystyrene polymers sold under the name Versaflex® sold by National Starch and Chemical Company, especially Versaflex 7000.

Suitable polymers may be selected from the group consisting of water soluble and water dispersible polyacrylate polymers and copolymers containing at least one acrylate monomer, water swellable and alkali swellable polyacrylate polymers and copolymers containing at least one acrylate monomer, non-linear polyacrylate polymers cross-linked with at least one polyalkenyl polyether monomer, film-forming and water swellable non-soluble polyacrylate polymers, hydrophobically modified cross-linked polyacrylate polymers and copolymers containing at least one hydrophobic monomer, water dispersible associative and non-associative polyacrylate polymers and copolymers containing at least one acrylate monomer, and mixtures thereof. Examples of hydrophobically modified alkali soluble acrylic polymer emulsions are sold under the name ACUSOL® by Rohm and Haas. In additional suitable polymers, copolymers or derivatives thereof are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xantham and carrageen. Exemplary polymers are also selected from polyacrylates and water-soluble acrylate copolymers, methyl-cellu-lose, carboxymethylcellulose sodium, dextrin, ethylcellulose, hydroxyl-ethyl cellulose, hydroxypropyl methylcellulose, maltodextrin, polymethacrylates. Also suitable are polymers are selected from polyvinyl alcohols, polyvinyl alcohol copolymers, hydroxypropyl methyl cellulose (HPMC), xantham gum and starch. The polymer may have any weight average molecular weight from about 1000 to 1,000,000, or even from 10,000 to 300,000 or even from 15,000 to 200,000 or even from 20,000 to 150,000.

Also useful are polymer blend compositions, for example blends comprising a hydrolytically degradable and water-soluble polymer blend such as polylactide and polyvinyl alcohol, achieved by the mixing of polylactide and polyvinyl alcohol, typically comprising 1-35% by weight polylactide and approximately from 65% to 99% by weight polyvinyl alcohol, if the material is to be water-dispersible, or water-soluble.

In general, natural polymers and derivatized natural polymers may be employed as rheology modifiers. Some non-limiting examples of natural polymers and derivatized natural polymers suitable for use in the present invention include polysaccharide polymers, which include substituted cellulose materials like carboxymethylcellulose, ethyl cellulose, hydroxyethylcellulose, hydroxypropyl-cellulose, hydroxymethylcellulose, succinoglycan and naturally occurring polysaccharide polymers like xanthan gum, guar gum, locust bean gum, tragacanth gum, carrageen gum or derivatives thereof. Also suitable are polypeptides and proteins, for example, but not limited to gelatin and gelatin derivatives, peptin, peptone, and the like, as well as polysaccharide and peptide copolymers, such as peptidoglycans and the like.

Also suitable for use as rheology modifiers are inorganic thickeners, generally in the form of fine particulate additives including colloids and nanoparticulates. Examples of such inorganic thickeners include, but are not limited to materials such as natural clays, silicas, zeolites, finely divided metal oxides, finely divided inorganic minerals and nanoparticulate forms of such materials, and their mixtures. Also included are derivatized inorganic thickening agents, such as for example, fumed silica, silanized silica and hydrophobized silica, and the like. Examples of metal oxides include, but are not limited to, oxides of alkali metals, alkaline earth metals, transition metals of the Group IIA, IVB, VB, VIIB, VIII, IB, IIB, IIA and IVA periodic groups.

In suitable embodiments, the rheology modifier comprises 0.0001% by weight to about 15% by weight, or 0.001% by weight to about 10% by weight, or alternatively 0.01% by weight to about 5% by weight of the inventive composition.
Silicone The protectant composition comprises about 5% to about 15% by weight of the composition. The composition of the present invention requires at least one organopolysiloxane fluid. These fluids are also commonly referred to as "silicone oils" or "silicones" and are distinguished from silicone elastomers and resins, which are more thoroughly cross-linked than silicone oils. The silicone of the composition is preferably an organopolydimethyl siloxane which has a neat viscosity from about 10 cSt to about 1,000,000 cSt, and preferably from about 50 cSt to about 100,000 cSt. The protectant composition forms a sprayable, aqueous organo-polysiloxane emulsion. In one embodiment, he silicone component of the composition may contain a mixture of both low and high viscosity organopolysiloxanes.

More generally, the organopolysiloxanes are those which can be readily dispersed to form aqueous emulsions, and which are stable to gelation in the aqueous composition. Preferred are polydimethylsiloxanes end-capped with dimethylsilanolyl groups, or more preferably, trimethylsilyl groups. Polydimethyl-siloxanes which are lightly or modestly branched are also preferred. A further category of preferred organopolysiloxanes are aminoalkyl-functional and polyaminopolyalkyl-functional polydimethylsiloxanes having terminal, pendant, or both terminal and pendant aminoalkyl or polyaminopolyalkyl groups. Mixtures of various organopolysiloxanes may be used as well, particularly mixtures of organopolysiloxanes of differing viscosities, for example, mixtures of low and high viscosity siloxanes, for example, mixtures of siloxanes having viscosities in the ranges of 10 cSt to 10,000 cSt and 1000 cSt to 1,000,000 cSt, with the siloxane in latter range being of higher viscosity than that in the former range. In addition to polydimethyl-siloxanes, resinous organopolysiloxanes, in minor amounts, may be added to improve durability.

The organopolysiloxanes are employed in the form of an aqueous emulsion, preferably one having relatively small particle size, for example in the range of 10 nm to 1000 nm, more preferably in the range of 100 nm to 800 nm, and most preferably in the range of 200 nm to 450 nm.

Suitable silicone fluids include those based on organopolysiloxanes, these being selected from the class of polymers having the general formula

(RnSiO((4−n)/2))m    (I)

wherein n is between 0 and 3 and m is 2 or greater, and R is alkyl or aryl, as defined in Silicone Compounds Register and Review, 5th Edition, R. Anderson, G. L. Larson and C. Smith Eds., Hüls America Inc., Piscataway, N.J., p 247 (1991), which is hereby incorporated by reference. The value of m may be as large as one million or more, but more commonly has a value of between about 5 and 1000, these being readily flowable liquids with good handling properties and performance characteristics. These example silicones can be linear or branched. Various naming conventions and nomenclature that are essentially equivalent to this exemplary class of silicones, include, but are not limited to: dialkylpolysiloxane hydrolyzate; alpha-alkyl-omega-methoxypolydialkylsiloxane; polydialkyl silicone oil; poly(dialky-lsiloxane); alkyl end-blocked polydialkylsiloxane; polyoxy(dialkylsilylene), alpha-(trialkylsilyl)-omega-hydroxy; poly[oxy(dialkyl-silylene)], alpha-[trialkylsilyl]-omega-[(trialkylsilyl)oxy]; and alpha-(trialkylsilyl)poly [oxy(dialkylsilylene)]-omega-alky. Some additional suitable examples also include dimethicone copolyol, dimethylpolysiloxane, diethylpolysiloxane, high molecular weight dimethicone, mixed C1-C30 alkyl polysiloxane, phenyl dimethicone, dimethiconol, and mixtures thereof.

Nonlimiting examples of silicones useful herein are also described in U.S. Pat. No. 5,011,681, to Ciotti et al., which is hereby incorporated by reference. The silicone compounds useful herein also include polyalkyl or polyaryl siloxanes. The alkyl or aryl groups substituted on the siloxane chain (R) or at the ends of the siloxane chains can have any structure as long as the resulting silicone remains fluid at or around room temperature. Suitable R groups include hydroxy, methyl, methoxy, ethyl, ethoxy, propyl, propoxy, phenyl, methylphenyl, phenylphenyl, aryl and aryloxy. One or more R groups on the silicon atom may represent the same group or different groups, or any combination thereof. Suitable silicone compounds are polydimethylsiloxane, polydiethylsiloxane, and polymethylphenylsiloxane. Polydimethylsiloxane, which is also known as dimethicone, is suitable and readily available in many forms and grades, including for example, edible grades suitable for use in compositions for food contact usage. The polyalkylsiloxanes that can be used include, for example, polydimethylsiloxanes. These silicone compounds are available, for example, from the General Electric Company in their Viscasil® and SF 96 series, and from Dow Corning in their Dow Corning 200 series. Polyalkylaryl siloxane fluids containing one or more alkyl or alkylaryl substituents can also be used, for example, and include, but are not limited to polymethylphenylsiloxanes, poly[(dimethy-siloxane)/(methylvinylsiloxane)], poly[(dimethylsiloxane)/(diphenylsiloxane)], poly-[(dimethylsiloxane)/(phenylmethylsiloxane)], and poly[(dimethylsiloxane)/(diphenyl-siloxane)/(methylvinylsiloxane)]. These siloxanes are available, for example, from the General Electric Company as SF 1075 methyl phenyl fluid or from Dow Corning as 556 Cosmetic Grade Fluid, Rhodorsil 763 from Rhône-Poulenc, Silbione 70641 V 30 and 70641 V 200 from Rhône-Poulenc, the silicones of the PK series from Bayer, such as PK20, the silicones of the PN and PH series from Bayer, such as PN 1000 and PH 1000, and certain oils of the SF series from General Electric, such as SF 1250, SF 1265, SF 1154 and SF 1023. Higher molecular weight silicones, including silicone gums and resins, may be used in accordance with the present invention and include polydiorgano-siloxanes with a molecular mass of between 200,000 and 5,000,000, used alone or as a mixture in a solvent chosen from volatile silicones, polydimethyl-siloxane (PDMS) oils, polyphenylmethylsiloxane (PPMS) oils, isoparaffins, methylene chloride, pentane, dodecane, tridecane and tetradecane, or mixtures thereof.

The silicones can be linear or branched, and can be modified by chemical groups to provide additional properties. For example, suitable silicones also include the amino modified silicones, wherein R is an amine, amide or alkyl, dialkyl or trialkyl derivatized amine constituent. By substitution of one or more of the R groups with other organic or functionalized organic groups, such as vinyl, phenyl, fluoroalkyl, perfluoroalkane, carboxylic acid derivatives, carboxyester and quaternary ammonium derivatives, other organopolysiloxanes can be produced. Included are mixtures of these materials, for example, but not limited to: 1) mixtures formed from a polydimethylsiloxane hydroxylated at the end of the chain (Dimethiconol according to the CTFA nomenclature) and from a cyclic polydimethylsiloxane (Cyclomethicone according to the CTFA nomenclature), such as the product Q2 1401 sold by the company Dow Corning; 2) mixtures formed from a polydimethylsiloxane gum with a cyclic silicone, such as the product SF 1214 Silicone Fluid from General Electric, which is an SE 30 gum of MW 500,000 dissolved in SF 1202 Silicone Fluid (decamethyl-cyclopentasiloxane); 3) mixtures of two PDMS materials of different viscosities, for example a PDMS gum and a PDMS oil, such as the products SF 1236 and CF 1241 from the company General Electric. The product "SF 1236" is a mixture of an SE 30 gum defined above, with a viscosity of 20 m2/s, and of an SF 96 oil with a viscosity of 5-10–5 m2/s (15% SE 30 gum and 85% SF 96 oil). The product "CF 1241" is a mixture of an SE 30 gum (33%) and of a PDMS (67%) with a viscosity of 10-3 m2/s.

The organo-modified silicones in accordance with the present invention are silicones as defined above, containing in their general structure one or more organofunctional groups directly attached to the siloxane chain or attached via a hydrocarbon-based radical. Examples include silicones containing: a) polyethyl-eneoxy and/or polypropyleneoxy groups, optionally containing alkyl groups, such as: the product known as dimethicone copolyol sold by the company Dow Corning under the name "DC 1248", and alkyl (C12) methicone copolyol sold by the company Dow Corning under the name "Q2 5200", the oils "Silwet" L 722, L 7500, L 77 and L 711 from the company General Electric, the mixture of dimethicone copolyol and of cyclomethicone, such as the product sold under the name "Q2-3225C" by the company Dow Corning; the product "Mirasil DMCO" sold by Rhône-Poulenc; b) (per)fluoro groups, for instance trifluoroalkyl groups, such as, for example, those sold by the company General Electric under the names "FF 150 Fluorosilicone Fluid" or by the company Shin Etsu under the names "X-22-819", "X-22-820", "X-22-821", "X-22-822" or "FL 100"; c) hydroxyl-acylamino groups, such as those described in European patent application EP-A-0,342,834, and in particular the silicone sold by the company Dow Corning under the name "Q2-8413"; d) thiol groups, such as in the silicones "X 2-8360" from Dow Corning or "GP 72A" and "GP 71" from Genesee; Union Carbide or the silicone known as "Amodimethicone" in the CTFA dictionary; f) carboxylate groups, such as the products described in European patent EP 186,507 from Chisso Corporation, which is hereby incorporated by reference; g) hydroxylated groups, such as the polyorganosiloxanes containing a hydroxyalkyl function, described in patent application FR-A-2,589,476, which is hereby incorporated by reference, and in particular polyorganosiloxanes containing a γ-hydroxy-propyl function; h) alkoxylated groups containing at least 12 carbon atoms, such as the product "Silicone Copolymer F 7551" from SWS Silicones and the products "Abilwax 2428", "Abilwax 2434" and "Abilwax 2440" from the company Goldschmidt; i) acyloxyalkyl groups containing at least 12 carbon atoms, such as, for example, the poly-organosiloxanes described in patent application FR-A-2,641,185, which is hereby incorporated by reference, and in particular polyorganosiloxanes containing a stearoyloxypropyl function; j) quaternary ammonium groups, such as in the products "X2 81 08" and "X2 81 09" and the product "Abil K 3270" from the company Goldschmidt; k) amphoteric or betaine groups, such as in the product sold by the company Goldschmidt under the name "Abil B 9950"; l) bisulphite groups, such as in the products sold by the company Goldschmidt under the names "Abil S 201" and "Abil S 255".

The block copolymers having a polysiloxane-polyoxy-alkylene linear block as repeating unit, which are used in the context of the present invention, include those have the following general formula $$([Y(R_2SiO)_aR'_2SiYO][C_nH_{2n}O]_b])_c \qquad (II)$$

in which R and R', which may be identical or different, represent a monovalent hydrocarbon-based radical containing no aliphatic unsaturation, n is an integer ranging from 2 to 4, a is an integer greater than or equal to 5, particularly between 5 and 200 and even more particularly between 5 and 100, b is an integer greater than or equal to 4, particularly between 4 and 200 and even more particularly between 5 and 100, c is an integer greater than or equal to 4, particularly between 4 and 1000 and even more particularly between 5 and 300, Y represents a divalent organic group which is linked to the adjacent silicon atom via a carbon-silicon bond and to a polyoxyalkylene block via an oxygen atom, the average molecular weight of each siloxane block is between about 400 and about 10,000, that of each poly-oxyalky-lene block being between about 300 and about 10,000, the siloxane blocks represent from about 10% to about 95% of the weight of the block copolymer, the average molecular weight of the block copolymer being at least 3000 and particularly between 5000 and 1,000,000 and even more particularly between 10,000 and 200,000. R and R' are suitably chosen from the group comprising alkyl radicals such as, for example, the methyl, ethyl, propyl, butyl, pentyl, hexyl, octyl, decyl and dodecyl radicals, aryl radicals such as, for example, phenyl and naphthyl, arylalkyl radicals such as, for example, benzyl and phenethyl, and tolyl, xylyl and cyclohexyl radicals. Y is suitably selected from radicals including —R''—, —R''—CO—, —R''—NHCO—, —R''—NH—CO—NH—R''—NHCO or —R''—OCONH—R'''—NHCO—, where R'' is a divalent alkylene group such as, for example, ethylene, propylene or butylene, and R''' is a divalent alkylene group or a divalent arylene group such as —C6H4, —C6H4C6H4-, C6H4-CH2-C6H4-C(CH3) 2C6H4. Even more particularly, Y represents a divalent alkylene radical, more particularly the —CH2-CH2-CH2- radical or the —C4H8- radical. The preparation of the block copolymers used in the context of the present invention is described in European application EP 0,492,657 A1, which is hereby incorporated by reference.

Also suitable for use, and particularly in combination with other silicone oils, are the class of silicone wetting and/or leveling agents which aid in the spreading and leveling of silicone oils onto treated surfaces. Some of the exemplary silicones described above may serve this purpose in addition to their coating properties. Additional examples also include, but are not limited to, polyalkylene-oxide modified poly-dimethylsiloxane, available from General Electric as Silwet 7650, polyalkylene-oxide modified heptamethyl-trisiloxane, also available from General Electric as Silwet 7280 and Silwet 7608, silicone glycol copolymer surfactant, available from Dow Corning as DC 57 and the Dow Corning silicone polyether surfactant designated Q2-5211. Another example from Dow Corning is a polyalkyleneoxide modified hept-methyltrisiloxane designated FZ-77. Additional examples also include materials with additional leveling properties, such as for example, but not limited to alkyl methyl siloxanes DC 56 available from Dow Corning and organomodi-fied dimethylsiloxane available from General Electric designated as Formasil 433.

Mixtures and combinations of any of the silicone oils exampled herein, for example, silicone oils having different molecular weights, different viscosities, different function-alized derivatives, different volatilities and/or vapor pressures, different properties and benefits, and combinations thereof, may advantageously be combined in the compositions of the present invention. For example, a "lighter" or lower viscosity polyorganosiloxane can be combined with a "heavier" or higher viscosity silicone oil, and/or a silicone gum and/or silicone elastomer for purposes of dispersion in the compositions of the present invention, wherein the "heavier" materials would otherwise be difficult to handle and disperse if used solely or in combinations without a "lighter" silicone included. Alternatively, a volatile silicone oil may be combined with a less volatile or essentially non-volatile silicone oil, depending on the end use application. Alternatively, a silicone oil having spreading, wetting or selective leveling properties may be combined with another silicone oil in order to enhance the spreading and leveling of the combined silicone oil mixture for beneficial effect on the surfaces treated with the inventive compositions described herein.

The use of silicone oils in the inventive compositions containing these and other substituted organopolysiloxanes, and their combinations and mixtures, is a matter of choice, depending upon the material to be treated and/or the environment to which the treated materials are to be subject, as well as depending upon the desired surface characteristics desired to be imparted to the surface. The silicones may be premixed in their desired proportions prior to processing, or mixed during actual processing of the inventive compositions, or combined into the inventive compositions in any suitable order or fashion, subject solely to considerations of ease of handling, transport, mixing and processing of the inventive compositions.

The organopolysiloxane in the composition is believed to provide a water and water vapor resistant coating upon the surface of the treated materials to enhance their resistant to environmental stresses, such as water permeation, oxygen permeation and assault by other environmental contaminants.

The organopolysiloxanes are also useful for imparting a shine or glossy coating to the treated surfaces, resulting in enhanced appearance and other aesthetic benefits associated with modification of incident light, such as refractive and diffusive contributions to specular reflections that contribute to the perception of enhanced color and tone, and decreased perception of surface defects such as scratches, stress cracks, striations, and other surface defects that commonly develop on surfaces with normal age and wear. Hence, the organopolysiloxanes are useful for their restorative effect when used on aged and worn surfaces, particularly elastomeric surfaces that suffer most from these conditions.

The organopolysiloxane in the composition are also believed to provide a soil, oil, dirt and grime resistant coating upon the surface of the treated materials, such as for example, household surfaces including, but not limited to stainless steel, tile, porcelain, marble and the like, to enhance their resistant to staining and soiling, water and microbial growth. In one embodiment of the present invention, the organopoly-siloxane includes one or more of a silicone selected from polydimethyl-siloxane, polydiethyl-siloxane, polymethylphenylsiloxane, polyalkylarylsiloxane, polyethylene-oxydialkylsiloxane, polypropyleneoxydialkyl-siloxane and polydialkyl-cyclosiloxane.

In suitable embodiments, the organopolysiloxane comprises 5% by weight to about 15% by weight, or 5% by weight to about 12% by weight, or alternatively 8% by weight to about 10% by weight of the inventive composition.

The silicone component of the composition is used to form an aqueous organopolysiloxane emulsion, and may be in a concentrated or dilute organopoly-siloxane emulsion. Similar, conventional organopolysiloxane emulsions are commercially available. For example, Silicone Fluid Emulsions E10, E103P, E1044, E125P, E1656, E677, E60-350, E60-1000 and others, are available from Wacker Silicones, Adrian, Mich., and from Wacker-Chemie GmbH, Munich, Germany. Other suitable organopolysilxoanes include The emulsions of the subject invention may start with commercial emulsions to which the remaining ingredients are added, or may be prepared by mixing and emulsifying neat organopolysiloxane with the aid of suitable surfactants, and optionally including ingredients such as U.V. protectants, plasticizers, spreading agents, etc. Such emulsions generally contain from 40 to 70 weight percent organopolysiloxane, and are diluted with additional water for use. Glycols such as propylene glycol, ethylene glycol, or low molecular weight polyols such as glycerine, etc., may be added during the initial emulsion preparation to ensure a stable, readily dispersible emulsion concentrate.

The organopolysiloxane emulsions used herein are preferably stable emulsions with small particle size. By the term "stable" with respect to the emulsions is meant that the emulsions are free from separation for extended periods, in general with a room temperature shelf life of about 2 years or longer. Shelf life may be assessed by observation of the particle size after storage for one month at 50° C. In general, there should be less than a 20% increase in particle size over this period, more preferably less than a 10% increase. Particle size should be less than 450 nm. Stability can also be assessed by centrifuge tests. Stable emulsions should exhibit less than 1 inch of phase separation, more preferably less than 0.5 inch, and yet more preferably less than 0.2 inch. Most preferably, no phase separation is observed. Stable emulsions do not require additional surfactants, thickeners, or other additives over and above those initially used in the emulsification process to maintain freedom from separation or coalescence of the dispersed phase.

The organosilicone emulsion of the subject invention contain a gloss-improving additive. It has been surprisingly discovered that gloss-improving additives may be selected from inorganic thickening agents and watersoluble aqueous thickeners, present in exceptionally small amounts such that the protectants remain sprayable as that term is defined herein. Numerous thickeners in these categories have been tested, and all have been found to assist in improving gloss. Suitable gloss improving additives are preferably compositions which exhibit a modest increase in aqueous emulsion viscosity at low concentration. Examples of such water soluble additives are the various soluble polyacrylic acid and polyacrylic acid/polyacrylate copolymers, e.g. those available under the tradename CARBOPOL® or more specifically, CARBOPOL® EZ-3; various polyacryl-amides; associative polyethers such as polyoxyethylene and polyoxyethylene/polyoxypropylene copolymer polyethers capped with C 8-30α-olefin oxides; the various vegetable gums, e.g. gum tragacanth, gum acacia, gum arabic, carageenan gum, xanthan gum, and the like, and the various cellulose ethers, for example carboxymethyl cellulose, hydroxypropyl cellulose, and like products. Among the inorganic, water-insoluble thickeners, the various clay minerals, e.g. bentonite, and fumed silica are also suitable. In this respect, reference may be made to MCCUTCHEON'S VOLUME2: FUNCTIONAL MATERIALS, 1997 North American Edition, McCutcheon's Division, MC Publishing Co., Glen Rock, N.J.

Solvent

In one embodiment of the invention, the protectant composition does not contain any organic solvent. Instead of an organic solvent, the composition contains about 65% to about 95% water, or alternatively about 70% to 85% water, or alternatively about 75% to 85% water by weight of the composition. In one embodiment, the composition is essentially free of organic solvents because they contribute to a smeared or hazy appearance once the composition has dried on the surface. In this embodiment is it preferable to keep the composition free of organic solvents so that the composition forms a uniform, glossy and clear coating on the automotive surfaces.

In another embodiment of the invention the organic solvent comprises less than 1% of the composition, more preferably less than 0.5% of the composition and most preferably less than 0.01 percent of the composition. In a third embodiment of the invention, the protectant composition comprises a small amount of solvent to assist in removing dirt, grease, and other unwanted impurities from the surface to be treated. The particular solvent employed in the inventive composition may be selected depending on the particular end use application, and particularly on the type of surface to be treated. In addition, the solvent may serve to help solubilize non-water soluble or poorly water soluble adjuvants, such as ultraviolet light (UV) absorbers, fragrances, perfumes and the like, for the purpose of preventing separation of these ingredients in the inventive compositions. Suitable solvents include both hydrophilic and hydrophobic compounds, generally comprising solvents that are water soluble, water-miscible as well as water insoluble and water-immiscible compounds. Mixtures of any solvent may optionally be employed in the inventive compositions.

Suitable organic solvents include, but are not limited to monohydric alcohols and polyhydric alcohols, such as for example $C_{1-6}$ alkanols and $C_{1-6}$ diols, alkylene glycols, such as for example $C_{1-10}$ alkyl ethers of alkylene glycols, glycol ethers, such as for example $C_{3-24}$ alkylene glycol ethers, polyalkylene glycols, short chain carboxylic acids, short chain esters, isoparaffinic hydrocarbons, mineral spirits, alkylaromatics, terpenes, terpene derivatives, terpenoids, terpenoid derivatives, formaldehyde, and pyrrolidones. Alkanols include, but are not limited to the monohydric alcohols including for example methanol, ethanol, n-propanol, isopropanol, butanol, pentanol, and hexanol, and isomers thereof. Diols include, but are not limited to, methylene, ethylene, propylene and butylene glycols. Alkylene glycol ethers include, but are not limited to, ethylene glycol monopropyl ether, ethylene glycol monobutyl ether, ethylene glycol monohexyl ether, diethylene glycol monopropyl ether, diethylene glycol monobutyl ether, diethylene glycol monohexyl ether, propylene glycol methyl ether, propylene glycol ethyl ether, propylene glycol n-propyl ether, propylene glycol monobutyl ether, propylene glycol t-butyl ether, di- or tri-polypropylene glycol methyl or ethyl or propyl or butyl ether, acetate and propionate esters of glycol ethers. Short chain carboxylic acids include, but are not limited to, acetic acid, glycolic acid, lactic acid and propionic acid. Short chain esters include, but are not limited to, glycol acetate, and cyclic or linear volatile methylsiloxanes. Water insoluble solvents such as isoparaffinic hydrocarbons, mineral spirits, alkylaromatics, terpenoids, terpenoid derivatives, terpenes, and terpenes derivatives can be mixed with a water soluble solvent when employed.

Examples of organic solvent having a vapor pressure less than 0.1 mm Hg (20° C.) include, but are not limited to, dipropylene glycol n-propyl ether, dipropylene glycol t-butyl ether, dipropylene glycol n-butyl ether, tripropylene glycol methyl ether, tripropylene glycol n-butyl ether, diethylene glycol propyl ether, diethylene glycol butyl ether, dipropylene glycol methyl ether acetate, diethylene glycol ethyl ether acetate, and diethylene glycol butyl ether acetate (all available from ARCO Chemical Company).

The solvents, when employed, are optionally present at a level of from 0.001% to 10%, alternatively from 0.01% to 10%, or alternatively from 1% to 4% by weight.

Alkalinity Source

The inventive composition may include an alkalinity source which is believed to increase the effectiveness of the surfactant and overall cleaning efficiency of the compositions. The alkalinity source may be a builder, a buffer and/or a pH adjusting agent which can also function as a water softener and/or a sequestering agent in the inventive composition. The builder, buffer and pH adjusting agents may be used alone, or in mixtures, or in combination with or in the form of their appropriate conjugate acids and/or conjugate bases, for adjusting and controlling the pH of the inventive compositions.

A variety of builders or buffers can be used and they include, but are not limited to, phosphate-silicate compounds, zeolites, alkali metal, ammonium and substituted ammonium polyacetates, trialkali salts of nitrilotriacetic acid, carboxylates, polycarboxylates, carbonates, bicarbonates, polyphosphates, aminopolycarboxylates, polyhydroxysulfonates, and starch derivatives. Builders or buffers can also include polyacetates and polycarboxylates. The polyacetate and polycarboxylate compounds include, but are not limited to, sodium, potassium, lithium, ammonium, and substituted ammonium salts of ethylenediamine tetraacetic acid, ethylenediamine triacetic acid, ethylenediamine tetrapropionic acid, diethylenetriamine pentaacetic acid, nitrilotriacetic acid, oxydisuccinic acid, iminodisuccinic acid, mellitic acid, polyacrylic acid or polymethacrylic acid and copolymers, benzene polycarboxylic acids, gluconic acid, sulfamic acid, oxalic acid, phosphoric acid, phosphonic acid, organic phosphonic acids, acetic acid, and citric acid. These builders or buffers can also exist either partially or totally in the hydrogen ion form.

The builder agent can include sodium and/or potassium salts of EDTA and substituted ammonium salts. The substituted ammonium salts include, but are not limited to, ammonium salts of methylamine, dimethylamine, butylamine, butylenediamine, propylamine, triethylamine, trimethylamine, monoethanolamine, diethanolamine, triethanolamine, isopropanolamine, ethylenediamine tetraacetic acid and propanolamine.

Buffering and pH adjusting agents, when used, include, but are not limited to, organic acids, mineral acids, alkali metal and alkaline earth salts of silicate, metasilicate, polysilicate, borate, hydroxide, carbonate, carbamate, phosphate, polyphosphate, pyrophosphates, triphosphates, tetraphosphates, ammonia, hydroxide, monoethanolamine, monopropanolamine, diethanolamine, dipropanolamine, triethanolamine, and 2-amino-2methylpropanol. Suitable buffering agents for compositions of this invention are nitrogen-containing materials. Some examples are amino acids such as lysine or lower alcohol amines like monoalkanolamine, dialkanolamine and trialkanolamine. Examples of suitable alkanolamines include the mono-, di-, and tri-ethanolamines. Other suitable nitrogen-containing buffering agents are tri(hydroxymethyl)amino methane (TRIS), 2-amino-2-ethyl-1,3-propanediol, 2-amino-2-methyl-propanol, 2-amino-2-methyl-1,3-propanol, disodium glutamate, N-methyl diethanolamide, 2-dimethylamino-2-methylpropanol (DMAMP), 1,3-bis(methylamine)-cyclohexane, 1,3-diamino-propanol N,N'-tetra-methyl-1,3-diamino-2-propanol, N,N-bis(2-hydroxyethyl)glycine(bicine) and N-tris (hydroxymethyl)methyl glycine (tricine). Other suitable buffers include ammonium carbamate, citric acid, acetic acid. Mixtures of any of the above are also acceptable.

Useful inorganic buffers/alkalinity sources include ammonia, the alkali metal carbonates and alkali metal phosphates, e.g., sodium carbonate, sodium polyphosphate. For additional buffers see WO 95/07971, which is incorporated herein by reference. Other suitable pH adjusting agents include sodium or potassium hydroxide.

When employed, the alkalinity source, builder, buffer, or pH adjusting agent comprises at least about 0.001% and typically about 0.01% to 5% of the inventive composition. Alternatively, the builder, buffer or pH adjusting agent content is about 0.01% to 2%.

Adjuncts

The inventive composition may contain additional optional adjuncts, such as one or more cleaning agents, cleaning aids, protective agents, chelators, builders, cosolvents, cosurfactants, descalers, foam boosters, foam suppressants, surface modification agents, pH adjustors, pH buffers, wetting agents, stain and soil repellants, waxes, resins, polishes, abrasives, colloid stabilizers, waxes, lubricants, odor control agents, perfumes, fragrances and fragrance release agents, brighteners, fluorescent whitening agents, ultraviolet light (UV) absorbers, UV scatterers, excited state quenchers, anti-oxidants, oxygen quenchers, bleaching agents, electrolytes, dyes and/or colorants, phase stabilizers, emulsifiers, thickeners, defoamers, hydrotropes, cloud point modifiers, antimicrobial agents, preservatives, and mixtures thereof.

These optional one or more adjuncts may be employed in embodiments of the inventive compositions to provide further cleaning and protective benefits or functionality to the inventive compositions.

When employed, these one or more optional adjuncts may individually comprise 0.0001% by weight to about 5% by weight, or 0.001% by weight to about 5% by weight, or alternatively 0.01% by weight to about 1% by weight of the inventive composition.

Method of Use

The protectant compositions of the present invention are generally employed to protect and/or clean the surfaces of vehicles, including for example, but not limited to automobiles, trucks, aeroplanes, motorcycles, boats, marine vehicles, trailers, recreational vehicles, jet skis, snowmobiles, bicycles, tractors and scooters. The compositions of the present invention are suitably used to treat and clean a variety of surface materials that is materials of construction, including but not limited to, rubber, vinyl, leather, plastics, wood, elastomer, tires, wheels, wheel covers, tarpaulins, vehicular covers, and combinations thereof.

In one embodiment, compositions of the present invention may be applied directly onto a soiled or clean automotive surface, preferably by a manual sprayer or an aerosol sprayer. Alternatively, in other embodiment, compositions of the present invention may be applied onto an applicator, including for example, but not limited to, a sponge, wipe, towel, towelette, squeegee, absorbent cloth, foam, shami, or similar carrier or tool employing a combination thereof. In both methods of use, the Vertical Cling parameter of the inventive compositions is sufficient to substantially retain the applied compositions at the desired location. In embodiments in which the compositions of the present invention are first applied to an applicator and then applied to the soiled exterior surface or soiled material surface, the Vertical Cling parameter of the applied inventive compositions is sufficient to substantially retain the applied compositions at the desired location.

Application Means

Spray Dispensing

Compositions of the present invention may be also be sprayed directly onto the target surface and therefore may be packaged in a spray dispenser. The spray dispenser can be any of the manually activated means for producing a spray of liquid droplets as is known in the art, e.g. trigger-type, pump-type, electrical spray, hydraulic nozzle, sonic nebulizer, high pressure fog nozzle, non-aerosol self-pressurized, and aerosol-type spray means. Automatic activated means can also be used herein. These types of automatic means are similar to manually activated means with the exception that the propellant is replaced by a compressor.

The spray dispenser can be an aerosol dispenser. The aerosol dispenser comprises a container which can be constructed of any of the conventional materials employed in fabricating aerosol containers. The dispenser must be capable of withstanding internal pressure in the range of from about 5 to about 120 p.s.i.g. or alternatively from about 10 to about 100 p.s.i.g. The one important requirement concerning the dispenser is that it be provided with a valve member which will permit the inventive compositions contained in the dispenser to be dispensed in the form of a continuous stream or continuous spray of droplets. The aerosol dispenser utilizes a pressurized sealed container from which the inventive composition is dispensed through an actuator/valve assembly under pressure. The aerosol dispenser is pressurized by incorporating therein a gaseous component generally known as a propellant. A more complete description of commercially available aerosol-spray dispensers appears in U.S. Pat. No. 3,436,772, Stebbins; and U.S. Pat. No. 3,600,325, Kaufman et al.; both of said references are incorporated herein by reference.

Alternatively in one embodiment, the spray dispenser can be a self-pressurized non-aerosol container having a convoluted liner and an elastomeric sleeve. Said self-pressurized dispenser comprises a liner/sleeve assembly containing a thin, flexible radially expandable convoluted plastic liner of from about 0.010 to about 0.020 inch thick, inside an essentially cylindrical elastomeric sleeve. The liner/sleeve is capable of holding a substantial quantity of odor-absorbing fluid product and of causing said product to be dispensed. A more complete description of self-pressurized spray dispensers can be found in U.S. Pat. No. 5,111,971, Winer, and U.S. Pat. No. 5,232,126, Winer; both of said references are herein incorporated by reference.

Another type of aerosol spray dispenser is one wherein a barrier separates the invention composition from the propellant (usually compressed air or nitrogen), as is disclosed in U.S. Pat. No. 4,260,110, incorporated herein by reference. Such a dispenser is available from EP Spray Systems, East Hanover, N.J.

In another embodiment of the present invention, the spray dispenser is a non-aerosol, manually activated, pump-spray dispenser. Said pump-spray dispenser comprises a container and a pump mechanism which securely screws or snaps onto the container. The container comprises a vessel for containing the inventive composition to be dispensed. The pump mechanism comprises a pump chamber of substantially fixed volume, having an opening at the inner end thereof. Within the pump chamber is located a pump stem having a piston on the end thereof disposed for reciprocal motion in the pump chamber. The pump stem has a passageway there through with a dispensing outlet at the outer end of the passageway and an axial inlet port located inwardly thereof.

The container and the pump mechanism can be constructed of any conventional material employed in fabricating pump-spray dispensers, including, but not limited to: polyethylene; polypropylene; polyethyleneterephthalate;

blends of polyethylene, vinyl acetate, and rubber elastomer. Other materials can include stainless steel. A more complete disclosure of commercially available dispensing devices appears in: U.S. Pat. No. 4,895,279, Schultz; U.S. Pat. No. 4,735,347, Schultz et al.; and U.S. Pat. No. 4,274,560, Carter; all of said references are herein incorporated by reference.

In yet another embodiment, the spray dispenser is a manually activated trigger-spray dispenser. Said trigger-spray dispenser comprises a container and a trigger both of which can be constructed of any of the conventional material employed in fabricating trigger-spray dispensers, including, but not limited to: polyethylene; polypropylene; polyacetal; polycarbonate; polyethylenetere-phthalate; polyvinyl chloride; polystyrene; blends of polyethylene, vinyl acetate, and rubber elastomer. Other materials can include stainless steel and glass. The trigger-spray dispenser does not incorporate a propellant gas. The trigger-spray dispenser herein is typically one which acts upon a discrete amount of the inventive composition itself, typically by means of a piston or a collapsing bellows that displaces the composition through a nozzle to create a stream or spray of liquid. Said trigger-spray dispenser typically comprises a pump chamber having either a piston or bellows which is movable through a limited stroke response to the trigger for varying the volume of said pump chamber. This pump chamber or bellows chamber collects and holds the product for dispensing.

The trigger spray dispenser typically has an outlet check valve for blocking communication and flow of fluid through the nozzle and is responsive to the pressure inside the chamber. For the piston type trigger sprayers, as the trigger is compressed, it acts on the fluid in the chamber and the spring, increasing the pressure on the fluid. For the bellows spray dispenser, as the bellows is compressed, the pressure increases on the fluid. The increase in fluid pressure in either trigger spray dispenser acts to open the top outlet check valve. The top valve allows the product to be forced through the swirl chamber and out the nozzle to form a discharge stream or pattern. An adjustable nozzle cap can be used to vary the pattern of the fluid dispensed. For the piston spray dispenser, as the trigger is released, the spring acts on the piston to return it to its original position. For the bellows spray dispenser, the bellows acts as the spring to return to its original position. This action causes a vacuum in the chamber. The responding fluid acts to close the outlet valve while opening the inlet valve drawing product up to the chamber from the reservoir.

A more complete disclosure of commercially available dispensing devices appears in U.S. Pat. No. 4,082,223, Nozawa; U.S. Pat. No. 4,161,288, McKinney; U.S. Pat. No. 4,434,917, Saito et al.; U.S. Pat. No. 4,819,835, Tasaki; and U.S. Pat. No. 5,303,867, Peterson; all of said references are incorporated herein by reference. Broad arrays of trigger sprayers or finger pump sprayers are suitable for use with the compositions of this invention. These are readily available from suppliers such as Calmar, Inc., City of Industry, Calif.; CSI (Continental Sprayers, Inc.), St. Peters, Mo.; Berry Plastics Corp., Evansville, Ind.; or Seaquest Dispensing, Cary, Ill.

In general, the spray dispensers are most suitably employed with inventive compositions that also display some degree of shear thinning character in addition to the Vertical Cling rheological characteristics of the present invention. Alternatively, the orifice size of the spray dispenser passageways, chambers, inlet and outlet orifices can be sized appropriately, which is to say generally enlarged in internal diameter with respect to sizes appropriate for thin liquids like water, to an extent governed by the viscosity of the inventive compositions to provide suitable dispensing characteristics.

Results and Discussion

Vertical Cling Parameter

The Vertical Cling parameter of a liquid material is determined in the following manner, using a test panel of a representative material selected for convenience of testing under controlled conditions. The representative material is a clear coated black painted metal test panel obtained from ACT Laboratories Co., Hillsdale, Mich., designated Ford F-Series APR437222. A rectangular test panel with an approximate size of about 18 inches in width and about 12 inches in height is divided into six vertical sections of equal dimensions so as to provide for six roughly equivalently sized sections of about 3 inch width by 12 inch length. Division of the six vertical sections may be done by use of a marking pen, tape or any such similar means that provides visual separation of the sections solely for ease in conducting the test. The six sections provide for test replicates. During testing, the test panel is positioned upright such that its shortest dimension is perpendicular to a flat horizontal support surface and the longest dimension is parallel to said horizontal, thus positioning the test panel in a generally vertical (upright) plane. The test panel is locked into position upright using a clamp or frame which holds in at angle of approximately 95° with respect to said horizontal, that is about 5° from normal to the vertical plane, oriented such that the test surface (front surface) is inclined backwards by 5° from a position normal to the plane. This position allows applied liquid material to contact the slightly declined front surface of the test panel, and under the influence of gravity to flow downward and along the front surface of the test panel for purposes of testing the Vertical Cling parameter of the liquid material.

Liquid material is prepared for application by placing approximately 3 milliliters of the liquid material in an appropriately sized syringe (5 or 10 milliliter volume) that is partially filled with 3 milliliters of the liquid material with air displaced so that the liquid material is positioned between the syringe orifice and plunger with no intervening air gap or trapped air bubbles present. Multiple syringes may be prepared or the same syringe used for replicates of the same liquid material. At the start of testing, the filled syringe with liquid material is held at the top of one of the six sections, at a position approximately 1 inch below the top and positioned so that the syringe orifice is approximately 2 inches from the surface of the test panel. Simultaneously, a) the syringe is manually depressed to dispense the liquid material onto the top of the test panel in one smooth motion to completely dispense all liquid; and b) a timer starting at zero time is initiated to provide elapsed time in seconds. After exactly 120 seconds (two minutes) has elapsed, a ruler with rulings indicating to at least 0.0125 inches is employed to measure the total length of the liquid material path (flow length), starting at the highest position where liquid material wet the test surface at the point of application and ending at the lowest position wetted by the flowing liquid material on the test surface. The flow length is recorded to the nearest 0.0125 inches. Additional replicates of the test are repeated following the same procedure using an aliquot of the liquid material in each succeeding section of the test panel to produce at least six individual flow length values. The average value of the six individual flow length replicate values represents the Vertical Cling parameter (in units of inches flow per 2 minutes) of the liquid material on the test surface.

It is noted that selected test materials, including liquid materials and test panels of the selected surface material are tested at about 25° C. Higher or lower temperatures can result in either increased or decreased flow rates owing to temperature sensitivity generally known in the art to be associated with the temperature-dependent rheological behavior of liquids. Thus, all testing is conducted using temperature equilibrated test materials and ambient temperatures of about 25° C. It was also noted that rinsing or pre-wetting of the test panel surfaces with water did not significantly affect measured values of the Vertical Cling parameter of the inventive compositions. Without being bound by theory, it is believed that the typical surfaces of interest and materials of construction of automotive surfaces are substantially non-absorbing and do not retain water to any significant extent, and particularly so on partially inclined or vertically oriented surfaces. Thus, for purposes of determining the Vertical Cling parameter, rinsing of the test panel or test materials is optional.

The Vertical Cling parameter thus represents a convenient and easy to measure parameter that describes the overall rheological behavior of the inventive compositions, which are characterized by their ability to cling to a vertical surface without running, dripping or flowing excessively, as defined by a Vertical Cling parameter value of between 1 to about 7. The inventive compositions have sufficient vertical clinging characteristics to exhibit a Vertical Cling parameter of at least 1. Compositions that are generally too viscous and also exhibit no measurable flow under conditions of the Vertical cling test that is to say exhibit a Vertical Cling parameter less than 1 or essentially zero, lack utility in that they are generally too viscous for ease of dispensing and for ease of application and spreading across a treated surface. Conversely, compositions that are generally less viscous and also exhibit a Vertical Cling parameter of greater than 7 are found to have insufficient cling to vertical surfaces. Inventive compositions exhibiting a Vertical Cling parameter of between 1 to about 7 generally tend to also exhibit ease of application with no excessive running or dripping from the desired application area enabling a minimum amount of the cleaning composition to be employed where needed. While the measured viscosity of the inventive compositions and the Vertical Cling parameter are not necessarily proportional, it is generally found that inventive compositions include those compositions having measured viscosities between about 2000 centipoise (cps) to about 20,000 cps while simultaneously exhibiting a Vertical Cling parameter of between 1 and about 7.

EXAMPLES

Examples of suitable embodiments of the inventive compositions are provided in Table 1. These example formulations are illustrative of the type of formulations encompassed in the present invention and are not an exhaustive list of possible formulations.

Viscosity measurements were also conducted and the example formulations in Table 1 had viscosities between the ranges of 4000 cps and 6000 cps, and preferably between the ranges of 4025 and 5075 cps, more preferably between about 4050 and 5050 cps. The Vertical Cling ranges for the Example formulations were between 1 and 7, more preferably between 1 and 5 and most preferably 1 and 3.

In contrast the comparative examples in Table 2, showed the viscosity of the formulations was between about 10 to 3000 cps and the Vertical Cling of these examples were in the range of 1 to 7. Surprisingly, it was found that the viscosity of the liquid materials as tested did not directly correlate with the measured Vertical Cling parameter. That is to say, the least viscous comparative product did not necessarily exhibit the slowest flow rate nor exhibit the least desirable Vertical Cling parameter. Without being bound by theory, it is believed that rheological contribution to the Vertical Cling characteristics of the inventive compositions include other factors, such as for example surface wetting, friction and shear flow behavior, that are not readily represented by a measured viscosity value alone. Thus, the Vertical Cling parameter represents the best measure of the inventive compositions and best describes the protectant compositions suitable for the methods of use, methods of application, and protectant kit as presented herein.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

TABLE 1

Protectant Spray Formulatios

| Ingredient | Ex. 1 | Ex. 2 | Ex. 3 | Ex. 4 | Ex. 5 | Ex. 6 |
| --- | --- | --- | --- | --- | --- | --- |
| Hydrophobically modified alkali soluble acrylic polymer | 0.54% | 0.21% | 0.25% | 0.75% | 0.05% | 0.03% |
| Sodium Bicarbonate | 0.027% | 0.027% | 0.027% | 0.027% | 0.027% | 0.027% |
| Polydimethylsiloxane Fluid (350 CST) | 11.93% | 12.00% | 8.00% | 5.00% | 10.00% | 8.00% |
| Triethanolamine 99 (1) | 0.6% | 0.3% | 0.31% | 0.73% | 0.08% | 0.06% |
| FZ-77 Superspreader (2) | 0.25% | 0.25% | 0.25% | 0.25% | 0.25% | 0.25% |
| Alkane sulfonate (anionic surfactant) | 0.35% | 0.31% | 0.45% | 0.42% | 0.35% | 0.38% |
| Alcohol ethoxylate (nonionic surfactants) | 0.43% | 0.38% | 0.30% | 0.42% | 0.39% | 0.36% |
| Preservative | 0.24% | 0.24% | 0.24% | 0.24% | 0.24% | 0.24% |
| Defoamer | 0.018% | 0.018% | 0.018% | 0.018% | 0.018% | 0.018% |
| UV absorber | 0.30% | 0.30% | 0.30% | 0.30% | 0.30% | 0.30% |
| Sodium Benzoate | 0.018% | 0.018% | 0.018% | 0.018% | 0.018% | 0.018% |
| Deionized water | q.s. | q.s. | q.s. | q.s. | q.s. | q.s. |
| Total | 100 | 100 | 100 | 100 | 100 | 100 |

(1) Triethanolamine with a low-freeze grade from Huntsman.
(2) Silicone surfactant superspreader from Dow Corning Co.

TABLE 2

Protectant Wipes Formulations

| Ingredient | Ex. 1 | Ex. 2 | Ex. 3 | Ex. 4 |
|---|---|---|---|---|
| Hydrophobically modified alkali soluble acrylic polymer | 0.11% | 0.09% | 0.18% | 0.21% |
| Sodium Bicarbonate | 0.42% | 0.42% | 0.42% | 0.42% |
| Polydimethylsiloxane Fluid (350 CST) | 9.24% | 28.95% | 18.55% | 28.95% |
| Triethanolamine 99 LFG-85% (1) | 0.12% | 0.09% | 0.27% | 0.30% |
| FZ-77 Superspreader (2) | 0.40% | 0.40% | 0.40% | 0.40% |
| Alkane sulfonate (anionic surfactant) | 0.10% | 0.31% | 0.20% | 0.31% |
| Alcohol ethoxylate (nonionic surfactants) | 0.40% | 1.26% | 0.81% | 1.26% |
| Preservative | 0.23% | 0.29% | 0.25% | 0.29% |
| Defoamer | 0.01% | 0.04% | 0.03% | 0.04% |
| UV absorber | 0.30% | 0.30% | 0.30% | 0.30% |
| Sodium Benzoate | 0.028% | 0.028% | 0.028% | 0.028% |
| Deionized water | q.s. | q.s. | q.s. | q.s. |
| Total | 100 | 100 | 100 | 100 |

(1) Triethanolamine with a low-freeze grade from Huntsman.
(2) Silicone surfactant superspreader from Dow Corning Co.

TABLE 3

Vertical Cling Test Data

| Liquid Material | Viscosity (1) cps | Vertical Drop in inches after 9 Seconds | Vertical Cling Measurement (2) |
|---|---|---|---|
| Comparative Product 1 (3) | 1500 | 11 | >7 |
| | | Vertical Drop in inches after 35 Seconds | |
| Comparative Product 2 (4) | 4034 | 11 | >7 |
| | | Vertical Drop in inches after 120 Seconds | |
| Inventive Example (5) | 4512 | 6.58 | 6.58 |

(1) Viscosity measured in centipoise (cps) at 25° C. using an LV Viscometer equipped with spindle #4 operating at 30 rpm.
(2) Vertical Cling parameter determined using clear coated black painted metal test panel obtained from ACT Laboratories Co., designated Ford F-Series APR437222.
(3) Example formulations found in U.S. Pat. Nos. 6,206,956 and 6,221,433 to Muntz et al. Comparative Product 1 contains 0.075% by weight actives CARBOPOL ® 940.
(4) Example formulations found in U.S. Pat. No. 6,206,956 and 6,221,433 to Muntz et al. Comparative Product 1 contains 1.2% by weight actives CARBOPOL ® 940.
(5) The Inventive Example formulation corresponds to the sample formulation found as Ex. 6 in Table 1 (above).

We claim:

1. An automotive protectant composition consisting essentially of:
   (a) a nonionic surfactant comprising an alcohol ethoxylate;
   (b) an anionic surfactant comprising a sulfonate surfactant;
   (c) about 5% to 15% by weight of a polyorganosiloxane;
   (d) about 0.05% to 0.3% by weight of a rheology modifier;
   (e) sodium benzoate;
   (f) optionally, one or more adjuncts selected from the group consisting of: chelators, builders, alkalizing agents, descalers, foam boosters, foam suppressants, surface modification agents, pH adjustors, pH buffers, wetting agents, stain and soil repellants, waxes, resins, polishes, colloid stabilizers, waxes, lubricants, odor control agents, perfumes, fragrances and fragrance release agents, brighteners, ultraviolet light (UV) absorbers, UV scatterers, dyes and/or colorants, phase stabilizers, emulsifiers, thickeners, defoamers, hydrotropes, cloud point modifiers, antimicrobial agents, and preservatives; and
   (g) about 65% to 95% by weight of water;
   wherein the automotive protectant has a viscosity greater than 4000 cps and less than about 6000 cps and exhibits a Vertical Cling parameter of between 1 and about 7 at a temperature of about 25° C.; and
   wherein the ratio of the nonionic surfactant to the anionic surfactant is about 1:1 to about 3:2.

2. The protectant composition of claim 1, wherein said viscosity is about 4025 to about 5075 cps.

3. The protectant composition claim 1, wherein said protectant has a viscosity of between 4500 cps to about 5500 cps.

4. The protectant composition of claim 1 further comprising a UV absorber.

5. The protectant composition of claim 1, wherein said composition does not contain any organic solvent.

6. The protectant composition of claim 1, wherein said rheology modifier is selected from the group consisting of organic polymers, natural polymers, inorganic thickeners, and mixtures thereof.

7. The protectant composition of claim 6, wherein said organic polymer is selected from the group consisting of acrylic polymers, methacrylic polymers, acrylamide polymers, acrylic and acrylamide copolymers, methacrylic and acrylamide copolymers and mixtures thereof.

8. An automotive protectant composition comprising:
   (a) a nonionic surfactant comprising an alcohol ethoxylate;
   (b) an anionic surfactant comprising a sulfonate surfactant;
   (c) about 5% to 15% by weight of a polyorganosiloxane;
   (d) about 0.05% to 0.3% by weight of a rheology modifier;
   (e) sodium benzoate; and
   (f) about 65% to 95% by weight of water;
   wherein the ratio of the nonionic surfactant to the anionic surfactant is about 1:1 to about 3:2.

9. The protectant composition of claim 8, wherein said automotive protectant composition is loaded onto a substrate.

10. The protectant composition claim 9, wherein said substrate comprises cellulosic fibers and synthetic fibers.

11. The protectant composition of claim 8, further comprises a UV absorber.

12. The protectant composition of claim 8, wherein said rheology modifier is selected from the group consisting of organic polymers, natural polymers, inorganic thickeners, and mixtures thereof.

13. The protectant composition of claim 12, wherein said organic polymer is selected from the group consisting of acrylic polymers, methacrylic polymers, acrylamide polymers, acrylic and acrylamide copolymers, methacrylic and acrylamide copolymers and mixtures thereof.

14. An automotive protectant composition consisting essentially of:
    (a) a mixture of nonionic and anionic surfactants; wherein the anionic surfactant comprises a sulfonate surfactant and the nonionic surfactant comprises an alcohol ethoxylate; and wherein the ratio of the nonionic surfactant to the anionic surfactant is about 1:1 to about 3:2;
(b) at least about 5% by weight of a silicone;
(c) about 0.05% to 0.3% by weight of a rheology modifier;
(d) sodium benzoate;
(e) optionally, one or more adjuncts selected from the group consisting of: chelators, builders, alkalizing agents, descalers, foam boosters, foam suppressants, surface modification agents, pH adjustors, pH buffers, wetting agents, stain and soil repellants, waxes, resins, polishes, colloid stabilizers, waxes, lubricants, odor control agents, perfumes, fragrances and fragrance release agents, brighteners, ultraviolet light (UV) absorbers, UV scatterers, dyes and/or colorants, phase stabilizers, emulsifiers, thickeners, defoamers, hydrotropes, cloud point modifiers, antimicrobial agents, and preservatives; and
(f) about 65% to 95% by weight of water.

15. The protectant composition of claim 14, wherein said rheology modifier is selected from the group consisting of acrylic polymers, methacrylic polymers, acrylamide polymers, acrylic and acrylamide copolymers, methacrylic and acrylamide copolymers and mixtures thereof.

16. The protectant composition of claim 14, wherein said silicone comprises a polydimethylsiloxane.

17. A protectant composition comprising:
(a) a nonionic surfactant comprising an alcohol ethoxylate;
(b) an anionic surfactant comprising a sulfonate surfactant;
(c) about 5% to 15% by weight of a polyorganosiloxane;
(d) about 0.05% to 0.3% by weight of a rheology modifier;
(e) sodium benzoate; and
(f) about 65% to 95% by weight of water;
wherein the protectant composition has a viscosity greater than 4000 cps and less than about 6000 cps and exhibits a Vertical Cling parameter of between 1 and about 7 at a temperature of about 25° C.; and
wherein the ratio of the nonionic surfactant to the anionic surfactant is about 1:1 to about 3:2.

18. The protectant composition of claim 17 further comprising one or more adjuncts selected from the group consisting of: chelators, builders, alkalizing agents, descalers, foam boosters, foam suppressants, surface modification agents, pH adjustors, pH buffers, wetting agents, stain and soil repellants, waxes, resins, polishes, colloid stabilizers, waxes, lubricants, odor control agents, perfumes, fragrances and fragrance release agents, brighteners, ultraviolet light (UV) absorbers, UV scatterers, dyes and/or colorants, phase stabilizers, emulsifiers, thickeners, defoamers, hydrotropes, cloud point modifiers, antimicrobial agents, and preservatives.

19. A protectant composition comprising:
(a) a nonionic surfactant comprising an alcohol ethoxylate;
(b) an anionic surfactant comprising a sulfonate surfactant;
(c) about 5% to 15% by weight of a polyorganosiloxane;
(d) about 0.05% to 0.3% by weight of a rheology modifier;
(e) sodium benzoate;
(f) about 65% to 95% by weight of water; and
wherein the ratio of the nonionic surfactant to the anionic surfactant is about 1:1 to about 3:2.

20. The protectant composition of claim 19 which has a viscosity greater than 4000 cps and less than about 6000 cps and exhibits a Vertical Cling parameter of between 1 and about 7 at a temperature of about 25° C.

21. The protectant composition of claim 19 further comprising one or more adjuncts selected from the group consisting of: chelators, builders, alkalizing agents, descalers, foam boosters, foam suppressants, surface modification agents, pH adjustors, pH buffers, wetting agents, stain and soil repellants, waxes, resins, polishes, colloid stabilizers, waxes, lubricants, odor control agents, perfumes, fragrances and fragrance release agents, brighteners, ultraviolet light (UV) absorbers, UV scatterers, dyes and/or colorants, phase stabilizers, emulsifiers, thickeners, defoamers, hydrotropes, cloud point modifiers, antimicrobial agents, and preservatives.

22. A protectant composition comprising:
(a) a mixture of nonionic and anionic surfactants; wherein the anionic surfactant comprises a sulfonate surfactant and the nonionic surfactant comprises an alcohol ethoxylate; and wherein the ratio of the nonionic surfactant to the anionic surfactant is about 1:1 to about 3:2;
(b) at least about 5% by weight of a silicone;
(c) about 0.05% to 0.3% by weight of a rheology modifier;
(d) sodium benzoate; and
(e) about 65% to 95% by weight of water.

23. The protectant composition of claim 22 which has a viscosity greater than 4000 cps and less than about 6000 cps and exhibits a Vertical Cling parameter of between 1 and about 7 at a temperature of about 25° C.

24. The protectant composition of claim 22 further comprising one or more adjuncts selected from the group consisting of: chelators, builders, alkalizing agents, descalers, foam boosters, foam suppressants, surface modification agents, pH adjustors, pH buffers, wetting agents, stain and soil repellants, waxes, resins, polishes, colloid stabilizers, waxes, lubricants, odor control agents, perfumes, fragrances and fragrance release agents, brighteners, ultraviolet light (UV) absorbers, UV scatterers, dyes and/or colorants, phase stabilizers, emulsifiers, thickeners, defoamers, hydrotropes, cloud point modifiers, antimicrobial agents, and preservatives.

25. A method of protecting a surface, said method comprising:
(a) applying a protectant composition to the surface, said protectant composition comprising:
(i) a nonionic surfactant comprising an alcohol ethoxylate;
(ii) an anionic surfactant comprising a sulfonate surfactant;
(iii) about 5% to 15% by weight of a polyorganosiloxane;
(iv) about 0.05% to 0.3% by weight of a rheology modifier;
(v) sodium benzoate; and
(vi) about 65% to 95% by weight of water; and
(b) spreading the protectant composition on said surface;
wherein the ratio of the nonionic surfactant to the anionic surfactant is about 1:1 to about 3:2.

26. The method of claim 25 wherein the surface is an automotive surface.

27. The method of claim 25 wherein the protectant composition has a viscosity greater than 4000 cps and less than about 6000 cps and exhibits a Vertical Cling parameter of between 1 and about 7 at a temperature of about 25° C.

28. The method of claim 25 wherein the protectant composition further comprises one or more adjuncts selected from the group consisting of: chelators, builders, alkalizing agents, descalers, foam boosters, foam suppressants, surface modification agents, pH adjustors, pH buffers, wetting agents, stain and soil repellants, waxes, resins, polishes, colloid stabilizers, waxes, lubricants, odor control agents, perfumes, fragrances and fragrance release agents, brighteners, ultraviolet light (UV) absorbers, UV scatterers, dyes and/or colorants, phase stabilizers, emulsifiers, thickeners, defoamers, hydrotropes, cloud point modifiers, antimicrobial agents, and preservatives.

29. A method of cleaning and protecting a surface, said method comprising:
(a) applying a protectant composition to the surface, said protectant composition comprising:
  (i) a nonionic surfactant comprising an alcohol ethoxylate;
  (ii) an anionic surfactant comprising a sulfonate surfactant;
  (iii) about 5% to 15% by weight of a polyorganosiloxane;
  (iv) about 0.05% to 0.3% by weight of a rheology modifier;
  (v) sodium benzoate; and
  (vi) about 65% to 95% by weight of water; and
(b) spreading the protectant composition on said surface;
wherein the ratio of the nonionic surfactant to the anionic surfactant is about 1:1 to about 3:2.

30. The method of claim 29 wherein the surface is an automotive surface.

31. The method of claim 29 wherein the protectant composition has a viscosity greater than 4000 cps and less than about 6000 cps and exhibits a Vertical Cling parameter of between 1 and about 7 at a temperature of about 25° C.

32. The method of claim 29 wherein the protectant composition further comprises one or more adjuncts selected from the group consisting of: chelators, builders, alkalizing agents, descalers, foam boosters, foam suppressants, surface modification agents, pH adjustors, pH buffers, wetting agents, stain and soil repellants, waxes, resins, polishes, colloid stabilizers, waxes, lubricants, odor control agents, perfumes, fragrances and fragrance release agents, brighteners, ultraviolet light (UV) absorbers, UV scatterers, dyes and/or colorants, phase stabilizers, emulsifiers, thickeners, defoamers, hydrotropes, cloud point modifiers, antimicrobial agents, and preservatives.

33. A kit comprising:
(a) a protectant composition comprising:
  (i) a nonionic surfactant comprising an alcohol ethoxylate;
  (ii) an anionic surfactant comprising a sulfonate surfactant;
  (iii) about 5% to 15% by weight of a polyorganosiloxane;
  (iv) about 0.05% to 0.3% by weight of a rheology modifier;
  (v) sodium benzoate; and
  (vi) about 65% to 95% by weight of water; and
(b) a dispensing package;
wherein the ratio of the nonionic surfactant to the anionic surfactant is about 1:1 to about 3:2.

34. The kit of claim 33 further comprising instructions for applying the protectant composition onto a surface.

35. The kit of claim 33 comprising a vehicular cleaning kit.

36. The kit of claim 33 wherein the dispensing package comprises a spray dispenser or an applicator.

37. The kit of claim 36 wherein the applicator comprises a sponge, wipe, towel, towelette, squeegee, absorbent cloth, foam or shami.

38. The kit of claim 34 wherein the surface is an automotive surface.

39. The kit of claim 33 wherein the protectant composition has a viscosity greater than 4000 cps and less than about 6000 cps and exhibits a Vertical Cling parameter of between 1 and about 7 at a temperature of about 25° C.

40. The kit of claim 33 wherein the protectant composition further comprises one or more adjuncts selected from the group consisting of: chelators, builders, alkalizing agents, descalers, foam boosters, foam suppressants, surface modification agents, pH adjustors, pH buffers, wetting agents, stain and soil repellants, waxes, resins, polishes, colloid stabilizers, waxes, lubricants, odor control agents, perfumes, fragrances and fragrance release agents, brighteners, ultraviolet light (UV) absorbers, UV scatterers, dyes and/or colorants, phase stabilizers, emulsifiers, thickeners, defoamers, hydrotropes, cloud point modifiers, antimicrobial agents, and preservatives.

41. An automotive protectant composition consisting essentially of:
(a) about 0.1% to about 5% by weight of a nonionic surfactant comprising an alcohol ethoxylate;
(b) about 0.1% to about 5% by weight of an anionic surfactant comprising a sulfonate surfactant;
(c) about 5% to 15% by weight of a polyorganosiloxane;
(d) about 0.05% to 0.3% by weight of a rheology modifier;
(e) sodium benzoate;
(f) optionally, one or more adjuncts selected from the group consisting of: chelators, builders, alkalizing agents, descalers, foam boosters, foam suppressants, surface modification agents, pH adjustors, pH buffers, wetting agents, stain and soil repellants, waxes, resins, polishes, colloid stabilizers, waxes, lubricants, odor control agents, perfumes, fragrances and fragrance release agents, brighteners, ultraviolet light (UV) absorbers, UV scatterers, dyes and/or colorants, phase stabilizers, emulsifiers, thickeners, defoamers, hydrotropes, cloud point modifiers, antimicrobial agents, and preservatives; and
(g) about 65% to 95% by weight of water;
wherein the ratio of the nonionic surfactant to the anionic surfactant is about 1:1 to about 3:2; and
wherein the automotive protectant has a viscosity greater than 4000 cps and less than about 6000 cps and exhibits a Vertical Cling parameter of between 1 and about 7 at a temperature of about 25° C.

42. An automotive protectant composition comprising:
(a) about 0.1% to about 5% by weight of a nonionic surfactant comprising an alcohol ethoxylate;
(b) about 0.1% to about 5% by weight of an anionic surfactant comprising a sulfonate surfactant;
(c) about 5% to 15% by weight of a polyorganosiloxane;
(d) about 0.05% to 0.3% by weight of a rheology modifier;
(e) sodium benzoate; and
(f) about 65% to 95% by weight of water;
wherein the ratio of the nonionic surfactant to the anionic surfactant is about 1:1 to about 3:2; and
wherein the automotive protectant has a viscosity greater than 4000 cps and less than about 6000 cps and exhibits a Vertical Cling parameter of between 1 and about 7 at a temperature of about 25° C.

43. An automotive protectant composition consisting essentially of:
(a) a mixture of nonionic and anionic surfactants comprising from about 0.1% to about 5% by weight of the nonionic surfactant and from about 0.1% to about 5% by weight of the anionic surfactant; wherein the anionic surfactant comprises a sulfonate surfactant and the nonionic surfactant comprises an alcohol ethoxylate; and wherein the ratio of the nonionic surfactant to the anionic surfactant is about 1:1 to about 3:2;
(b) at least about 5% by weight of a silicone;
(c) about 0.05% to 0.3% by weight of a rheology modifier;
(d) sodium benzoate;
(e) optionally, one or more adjuncts selected from the group consisting of: chelators, builders, alkalizing agents, descalers, foam boosters, foam suppressants, surface modification agents, pH adjustors, pH buffers, wetting agents, stain and soil repellants, waxes, resins, polishes, colloid stabilizers, waxes, lubricants, odor control agents, perfumes, fragrances and fragrance release agents, brighteners, ultraviolet light (UV) absorbers, UV scatterers, dyes and/or colorants, phase stabilizers, emulsifiers, thickeners, defoamers, hydrotropes, cloud point modifiers, antimicrobial agents, and preservatives; and
(f) about 65% to 95% by weight of water;
wherein the automotive protectant has a viscosity greater than 4000 cps and less than about 6000 cps and exhibits a Vertical Cling parameter of between 1 and about 7 at a temperature of about 25° C.

44. A protectant composition comprising:
(a) about 0.1% to about 5% by weight of a nonionic surfactant comprising an alcohol ethoxylate;
(b) about 0.1% to about 5% by weight of an anionic surfactant comprising a sulfonate surfactant;
(c) about 5% to 15% by weight of a polyorganosiloxane;
(d) about 0.05% to 0.3% by weight of a rheology modifier;
(e) sodium benzoate; and
(f) about 65% to 95% by weight of water;
wherein the ratio of the nonionic surfactant to the anionic surfactant is about 1:1 to about 3:2; and
wherein the protectant composition has a viscosity greater than 4000 cps and less than about 6000 cps and exhibits a Vertical Cling parameter of between 1 and about 7 at a temperature of about 25° C.

45. A protectant composition comprising:
(a) about 0.1% to about 5% by weight of a nonionic surfactant comprising an alcohol ethoxylate;
(b) about 0.1% to about 5% by weight of an anionic surfactant comprising a sulfonate surfactant;
(c) about 5% to 15% by weight of a polyorganosiloxane;
(d) about 0.05% to 0.3% by weight of a rheology modifier;
(e) sodium benzoate; and
(f) about 65% to 95% by weight of water;
wherein the ratio of the nonionic surfactant to the anionic surfactant is about 1:1 to about 3:2.

46. A protectant composition comprising:
(a) a mixture of nonionic and anionic surfactants comprising from about 0.1% to about 5% by weight of the nonionic surfactant and from about 0.1% to about 5% by weight of the anionic surfactant; wherein the anionic surfactant comprises a sulfonate surfactant and the nonionic surfactant comprises an alcohol ethoxylate; and wherein the ratio of the nonionic surfactant to the anionic surfactant is about 1:1 to about 3:2;
(b) at least about 5% by weight of a silicone;
(c) about 0.05% to 0.3% by weight of a rheology modifier;
(d) sodium benzoate; and
(e) about 65% to 95% by weight of water;
wherein the protectant composition has a viscosity greater than 4000 cps and less than about 6000 cps and exhibits a Vertical Cling parameter of between 1 and about 7 at a temperature of about 25° C.

47. A method of protecting a surface, said method comprising:
(a) applying a protectant composition to the surface, said protectant composition comprising:
(i) about 0.1% to about 5% by weight of a nonionic surfactant comprising an alcohol ethoxylate;
(ii) about 0.1% to about 5% by weight of an anionic surfactant comprising a sulfonate surfactant;
(iii) about 5% to 15% by weight of a polyorganosiloxane;
(iv) about 0.05% to 0.3% by weight of a rheology modifier;
(v) sodium benzoate; and
(vi) about 65% to 95% by weight of water; and
(b) spreading the protectant composition on said surface;
wherein the protectant composition has a viscosity greater than 4000 cps and less than about 6000 cps and exhibits a Vertical Cling parameter of between 1 and about 7 at a temperature of about 25° C.; and
wherein the ratio of the nonionic surfactant to the anionic surfactant is about 1:1 to about 3:2.

48. A method of cleaning and protecting a surface, said method comprising:
(a) applying a protectant composition to the surface, said protectant composition comprising:
(i) about 0.1% to about 5% by weight of a nonionic surfactant comprising an alcohol ethoxylate;
(ii) about 0.1% to about 5% by weight of an anionic surfactant comprising a sulfonate surfactant;
(iii) about 5% to 15% by weight of a polyorganosiloxane;
(iv) about 0.05% to 0.3% by weight of a rheology modifier;
(v) sodium benzoate; and
(vi) about 65% to 95% by weight of water; and
(b) spreading the protectant composition on said surface;
wherein the protectant composition has a viscosity greater than 4000 cps and less than about 6000 cps and exhibits a Vertical Cling parameter of between 1 and about 7 at a temperature of about 25° C.; and
wherein the ratio of the nonionic surfactant to the anionic surfactant is about 1:1 to about 3:2.

49. A kit comprising:
(a) a protectant composition comprising:
(i) about 0.1% to about 5% by weight of a nonionic surfactant comprising an alcohol ethoxylate;
(ii) about 0.1% to about 5% by weight of an anionic surfactant comprising a sulfonate surfactant;
(iii) about 5% to 15% by weight of a polyorganosiloxane;
(iv) about 0.05% to 0.3% by weight of a rheology modifier;
(v) sodium benzoate; and
(vi) about 65% to 95% by weight of water;
wherein the ratio of the nonionic surfactant to the anionic surfactant is about 1:1 to about 3:2; and wherein the automotive protectant has a viscosity greater than 4000 cps and less than about 6000 cps and exhibits a Vertical Cling parameter of between 1 and about 7 at a temperature of about 25° C.; and (b) a dispensing package.

* * * * *